US012756126B2

(12) United States Patent
Sundarakrishnamachari et al.

(10) Patent No.: US 12,756,126 B2
(45) Date of Patent: Oct. 6, 2026

(54) INTERLOCKING CONNECTOR DESIGN FOR ELECTRICAL CONNECTORS

(71) Applicant: Aptiv Technologies AG, Schaffhausen (CH)

(72) Inventors: Rangarajan Sundarakrishnamachari, Chennai (IN); Siddhan Manickam, Tamilnadu (IN); Sabari Dinesh Chidambaram, Tamilnadu (IN)

(73) Assignee: Aptiv Technologies AG, Schaffhausen (CH)

( * ) Notice: Subject to any disclaimer, the term of this patent is extended or adjusted under 35 U.S.C. 154(b) by 360 days.

(21) Appl. No.: 18/624,696

(22) Filed: Apr. 2, 2024

(65) Prior Publication Data

US 2025/0309578 A1 Oct. 2, 2025

(51) Int. Cl.
*H01R 13/436* (2006.01)
*H01R 13/506* (2006.01)
*H01R 43/20* (2006.01)

(52) U.S. Cl.
CPC ....... *H01R 13/4362* (2013.01); *H01R 13/506* (2013.01); *H01R 43/20* (2013.01)

(58) Field of Classification Search
None
See application file for complete search history.

(56) References Cited

U.S. PATENT DOCUMENTS 7,179,136 B1 2/2007 Morello
8,721,375 B2 * 5/2014 Hori .................... H01R 13/506 439/752
9,407,026 B2 8/2016 Campbell et al.
9,472,884 B2 * 10/2016 Kutsuna ............ H01R 13/4362
9,666,972 B2 * 5/2017 Martin .................... H01R 9/24
9,917,381 B1 3/2018 Campbell et al.
10,158,189 B2 * 12/2018 Kutsuna ............ H01R 13/4362
(Continued)

FOREIGN PATENT DOCUMENTS

EP 1764879 A1 3/2007
EP 3410540 A1 12/2018

OTHER PUBLICATIONS

"European Extended Search Report for EP Application No. 25160315.5"; European Patent Office; mailed on Nov. 5, 2025; 14 Pages.

*Primary Examiner* — Ross N Gushi
(74) *Attorney, Agent, or Firm* — Billion & Armitage

(57) ABSTRACT

An electrical connector includes an inner housing defining a plurality of terminal cavities and a plurality of flexible terminal retaining arms configured to retain electrical terminals within the terminal cavities. The connector includes a nose housing attached to the inner housing having a plurality of apertures arranged and aligned with openings of the terminal cavities. The connector includes an independent secondary lock (ISL) defining a plurality of raised pads and a tab. The ISL is configured to be disposed within the inner housing. The connector includes an outer housing attached to the inner housing by a flexible latching arm extending from the outer housing and engaging the inner housing. The raised pads are aligned with the terminal retaining arms when the ISL is in a fully-staged position within the inner housing. The tab is aligned with the flexible latching arm when the ISL is in the fully-staged position.

19 Claims, 18 Drawing Sheets

(56) References Cited

U.S. PATENT DOCUMENTS

| | | | | |
|---|---|---|---|---|
| 10,644,430 | B2 * | 5/2020 | Obata | H01R 13/5219 |
| 10,897,103 | B1 * | 1/2021 | Sundarakrishnamachari | H01R 13/5202 |
| 11,183,793 | B2 | 11/2021 | Liptak et al. | |
| 11,349,252 | B2 * | 5/2022 | Hiramatsu | H01R 13/521 |
| 11,502,444 | B2 | 11/2022 | Sundarakrishnamachari et al. | |
| 12,548,934 | B2 * | 2/2026 | Leme | H01R 13/42 |
| 2009/0186523 | A1 | 7/2009 | Campbell et al. | |
| 2016/0013575 | A1 | 1/2016 | Campbell et al. | |
| 2021/0391664 | A1 | 12/2021 | Pacher et al. | |
| 2022/0123495 | A1 | 4/2022 | Sundarakrishnamachari et al. | |

* cited by examiner

INTERLOCKING CONNECTOR DESIGN FOR ELECTRICAL CONNECTORS

TECHNICAL FIELD

This invention is directed to an electrical connector, particularly to one having an interlocking connector design for split electrical connectors.

BACKGROUND

Tooling that is used to form small electrical connectors as an integral assembly, i.e., a single housing is often difficult to economically design, manufacture, and use. Hence, small electrical housings are typically divided (split) into two or three housings. A connector nose housing and inner housing may be assembled before being secured to an outer housing by locking features. Since these locking features are typically placed inside the outer housing, it may be difficult to ensure that the locking features are properly engaged. These electrical connectors have no facilities to confirm that the locking features are locked properly. Also, there is chance of the locking feature failing during connector unmating due to large forces exerted on the locking features.

SUMMARY

In some aspects, the techniques described herein relate to an electrical connector, including an inner housing defining a plurality of terminal cavities and a plurality of flexible terminal retaining arms configured to retain electrical terminals within the terminal cavities; a nose housing attached to the inner housing and defining a plurality of apertures arranged and aligned with openings of the terminal cavities; an independent secondary lock defining a plurality of raised pads and a tab, the independent secondary lock configured to be disposed within the inner housing; and an outer housing to which the inner housing is attached by a flexible latching arm extending from the outer housing and engaging the inner housing, wherein the raised pads are aligned with the terminal retaining arms when the independent secondary lock is in a fully-staged position within the inner housing, thereby inhibiting the terminal retaining arms from flexing and inhibiting removal of the electrical terminals from the terminal cavities and wherein the tab is aligned with the flexible latching arm when the independent secondary lock is in the fully-staged position, thereby inhibiting the flexible latching arm from flexing and disengaging from the inner housing.

In some aspects, the techniques described herein relate to a method of assembling an electrical connector, including the steps of providing an inner housing defining a plurality of terminal cavities and a plurality of flexible terminal retaining arms configured to retain electrical terminals within the terminal cavities; providing a nose housing defining a plurality of apertures; providing an outer housing having a flexible latching arm extending from the outer housing; aligning the plurality of apertures with openings of the terminal cavities and attaching the nose housing to the inner housing; inserting an independent secondary lock defining a plurality of raised pads and a tab within the inner housing and placing it in a pre-staged position; attaching the outer housing to the inner housing by engaging the flexible latching arm with the inner housing, wherein the tab is offset from the flexible latching arm when the independent secondary lock is in the pre-staged position, thereby allowing the flexible latching arm to flex as it engages with the inner housing; inserting the electrical terminals within the terminal cavities, wherein the pads are offset from the terminal retaining arms when the independent secondary lock is in the pre-staged position, thereby allowing the terminal retaining arms to flex as the electrical terminals are inserted within the terminal cavities; and moving the independent secondary lock from the pre-staged position to a fully-staged position, wherein the pads are aligned with the terminal retaining arms, thereby inhibiting the terminal retaining arms from flexing and inhibiting removal of the electrical terminals from the terminal cavities and wherein the tab is aligned with the flexible latching arm, thereby inhibiting the flexible latching arm from flexing and disengaging from the inner housing.

BRIEF DESCRIPTION OF THE DRAWINGS

Embodiments of the present invention will now be described by way of example with reference to the accompanying drawings, in which.

DETAILED DESCRIPTION

Figure 1:
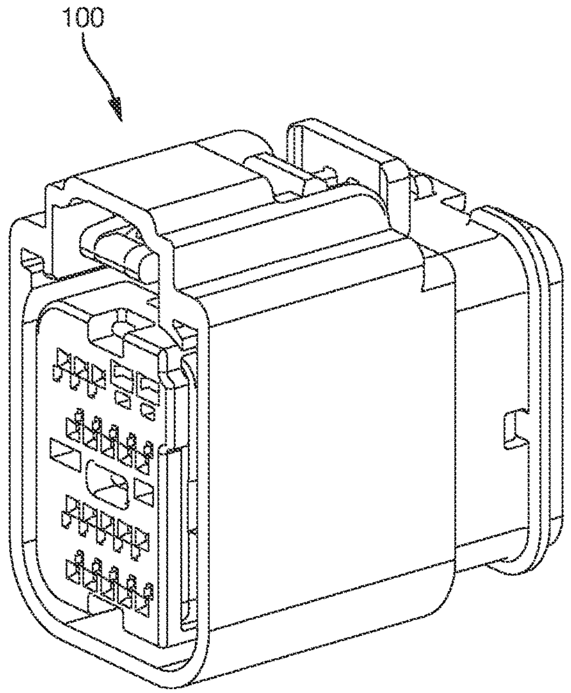
FIG. 1 shows an isometric view of a connector according to a first embodiment.
Figure 2:
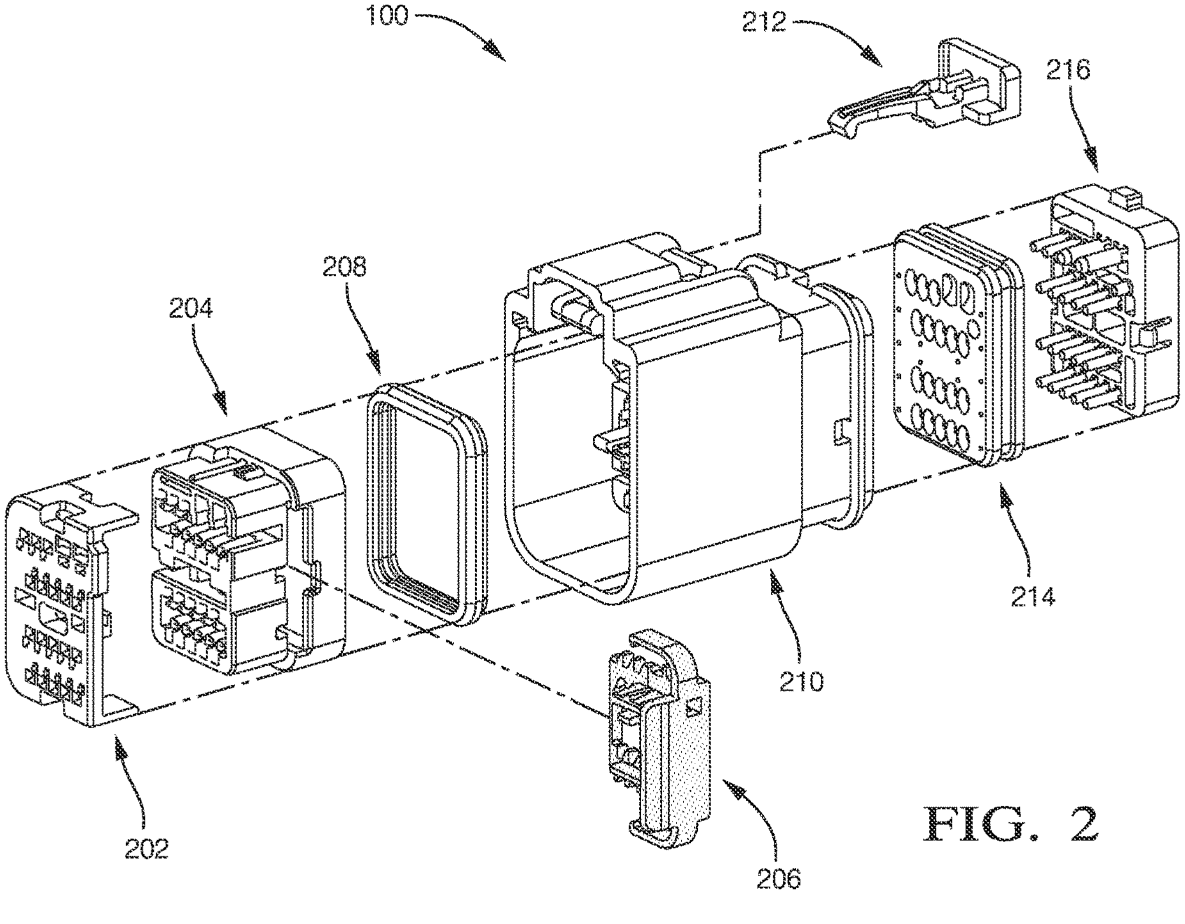
FIG. 2 shows an exploded view of the connector of FIG. 1 according to the first embodiment.
Figure 3:
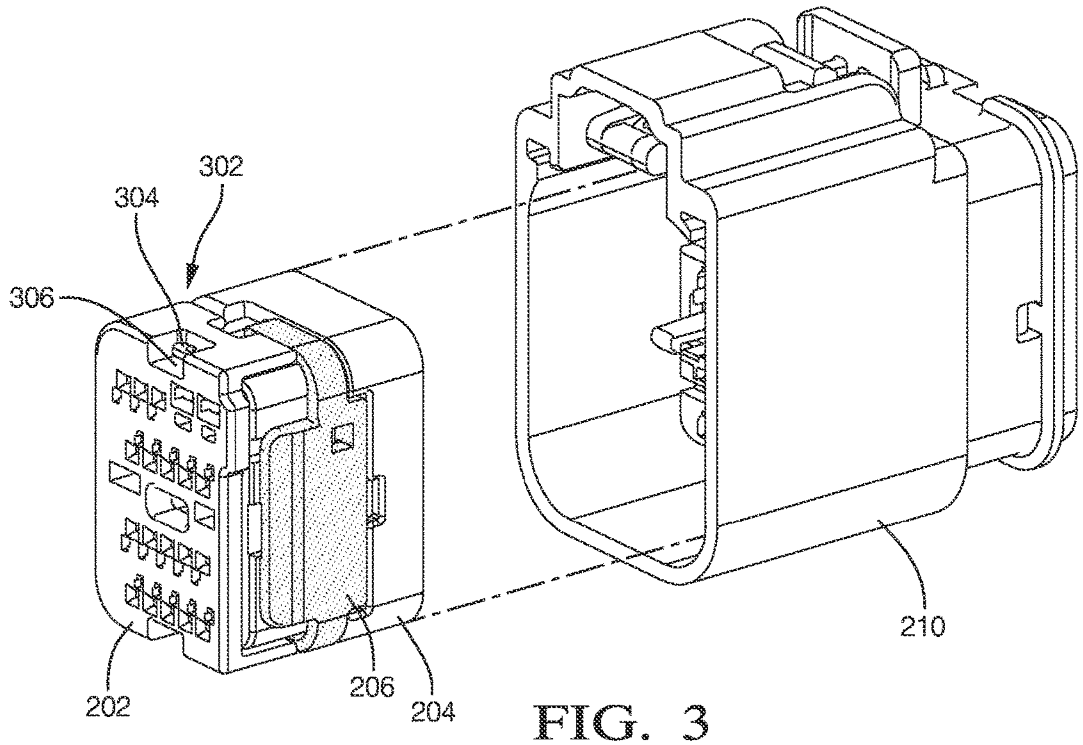
FIG. 3 shows an isometric view of subassemblies of the connector of FIG. 1 according to the first embodiment.

A first example of an electrical connector 100 according to a first embodiment is shown in FIGS. 1 through 14B. FIG. 1 shows an isometric assembled view of the electrical connector 100. FIG. 2 illustrates an exploded view of the electrical connector 100 showing that it includes a nose housing 202, an inner housing 204, an independent secondary lock, hereafter referred to as the ISL 206, a connector seal 208, an outer housing 210, a connector position assurance device, hereafter referred to as the CPA 212, a wire seal 214, and a seal retainer 216. Alternative embodiments of the electrical connector may be envisioned that do not include the connector seal 208, the wire seal 214, and/or the CPA 212. As shown in FIG. 3, the inner housing 204, the nose housing 202, and the ISL 206 are pre-assembled before being inserted within the outer housing 210. In some embodiments, the nose housing 202 is secured to the inner housing 204 by latch features 304 on the inner housing 204 that are disposed within openings 306 in the flexible locks 302 defined by the nose housing 202.

Figure 4A:
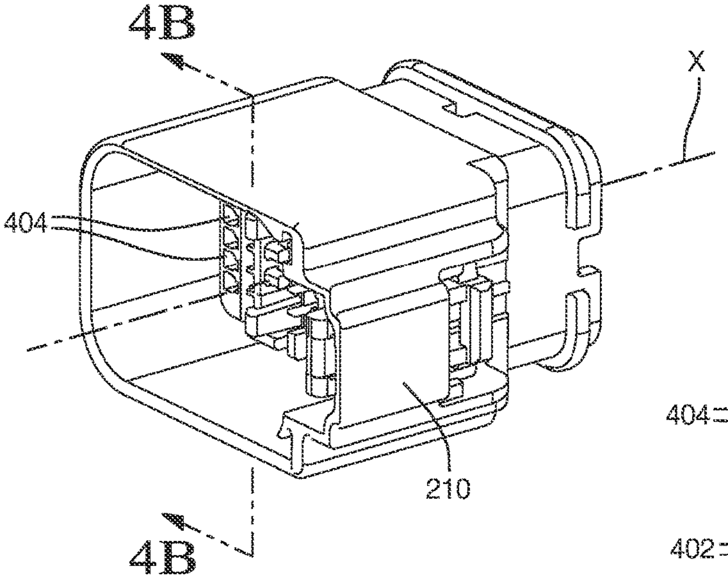
FIG. 4A shows an isometric view of an outer housing of the connector of FIG. 1 according to the first embodiment.
Figure 4B:
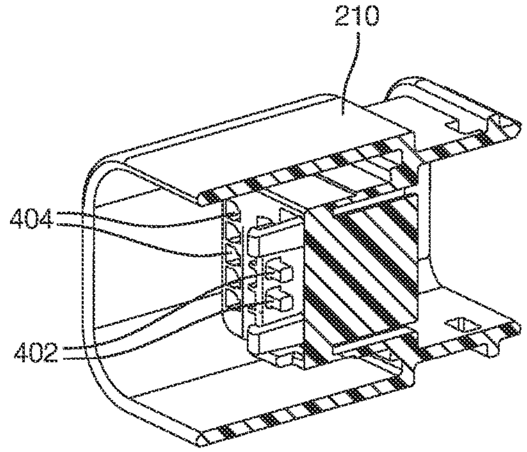
FIG. 4B shows a cross-section view of the outer housing along section line 4B-4B in FIG. 4A according to the first embodiment.

FIG. 4A is an isometric view of the outer housing 210 showing the section line for the cross-section view of FIG. 4B. As shown in FIG. 4B, the outer housing 210 defines a first protrusion, hereafter referred to as the housing interlocking tab 402 extending in a longitudinal direction, i.e., in a direction substantially parallel to the insertion axes X of the electrical terminals into the terminal cavities 404.

Figure 5A:
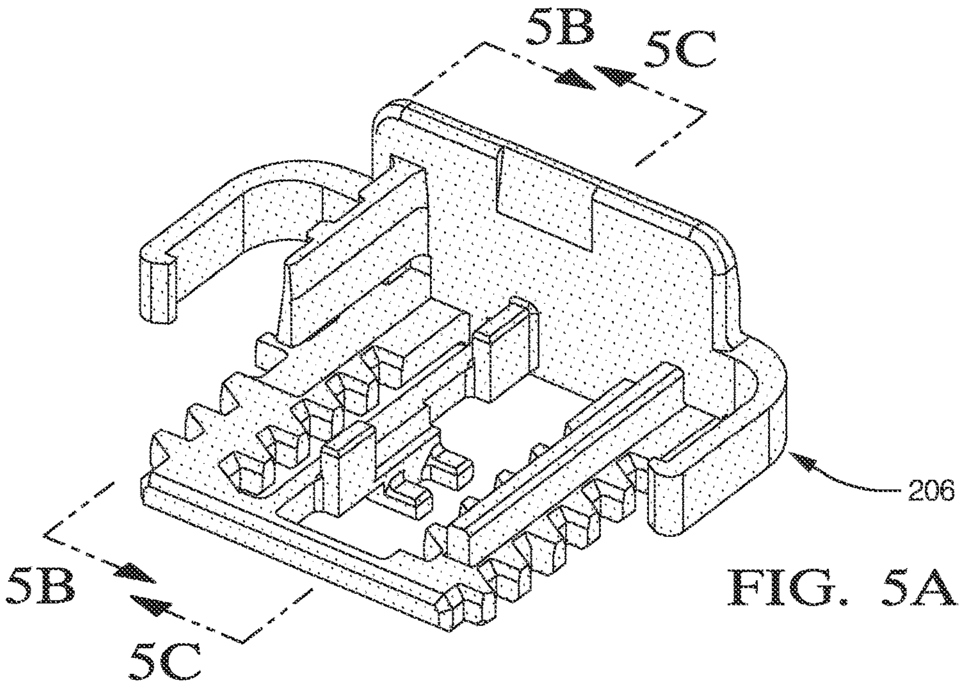
FIG. 5A shows an isometric view of an independent secondary lock (ISL) of the connector of FIG. 1 according to the first embodiment.
Figure 5B:
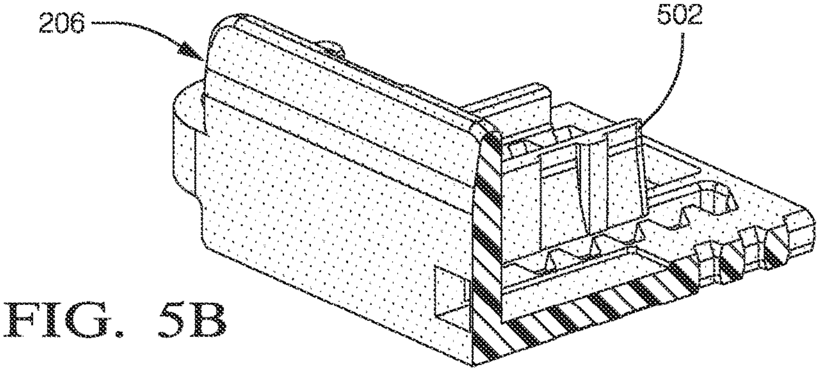
FIG. 5B shows a cross-section view of the ISL along section line 5B-5B in FIG. 5A according to the first embodiment.
Figure 5C:
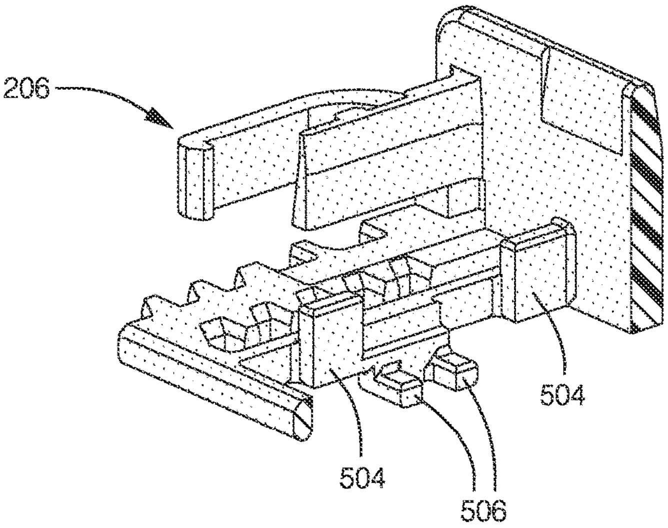
FIG. 5C shows a cross-section view of the ISL along section line 5C-5C in FIG. 5A according to the first embodiment.

As shown in FIGS. 5A to 5C, the ISL 206 defines a plurality of raised pads 502 and a tab 504. The ISL 206 is disposed within the inner housing 204. Additionally, the ISL 206 defines a second protrusion, hereafter referred to as the ISL interlocking tab 506, extending in lateral direction generally perpendicular to the longitudinal direction shown in FIG. 4A. In some embodiments, a first portion of the electrical terminals has a different size than a second portion of the electrical terminals. In this case, a first portion of the raised pads 502 associated with the first portion of the electrical terminals has a different size than a second portion of the raised pads 502 associated with the second portion of the electrical terminals.

Figure 6A:
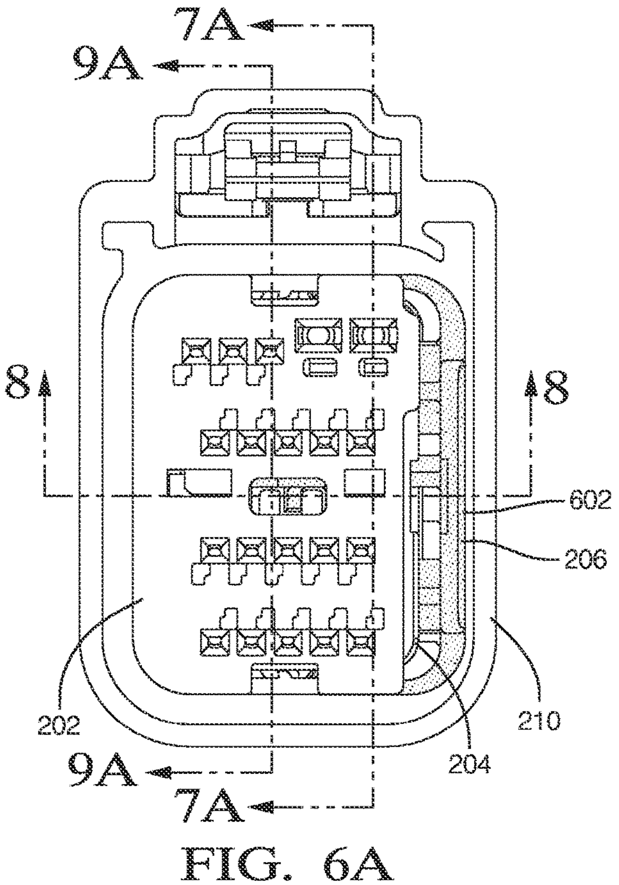
FIG. 6A shows a mating end view of the connector of FIG. 1 with ISL in a pre-staged condition according to the first embodiment.
Figure 6B:
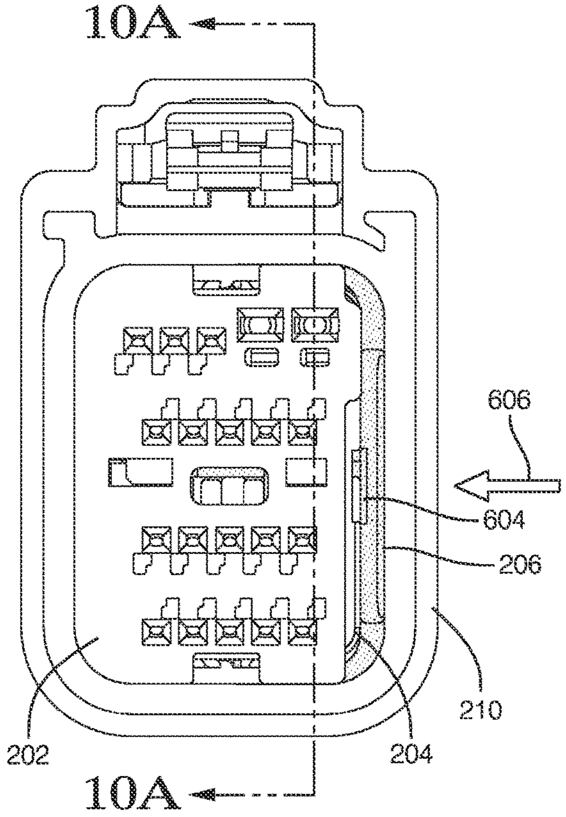
FIG. 6B shows a mating end view of the connector of FIG. 1 with ISL in a fully-staged condition according to the first embodiment.

The ISL 206 is slidably attached to the inner housing 204 and is moveable from a pre-staged position 602 shown in FIG. 6A to a fully-staged position 604 shown in FIG. 6B. FIG. 6A illustrates the section lines used to create the cross-section views of the electrical connector 100 in FIGS. 7A, 9, and 10A and FIG. 6B illustrates the section line used to create the cross-section view of the electrical connector 100 in FIG. 10A.

Figure 7A:
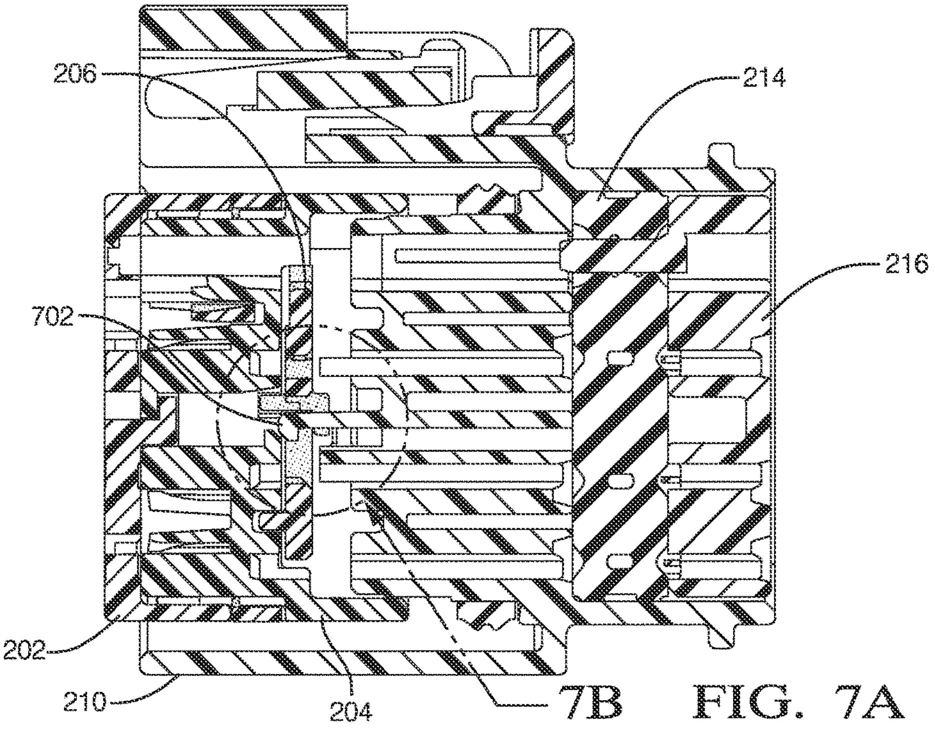
FIG. 7A shows a cross-section view of the connector along section line 7A-7A in FIG. 6A according to the first embodiment.
Figure 7B:
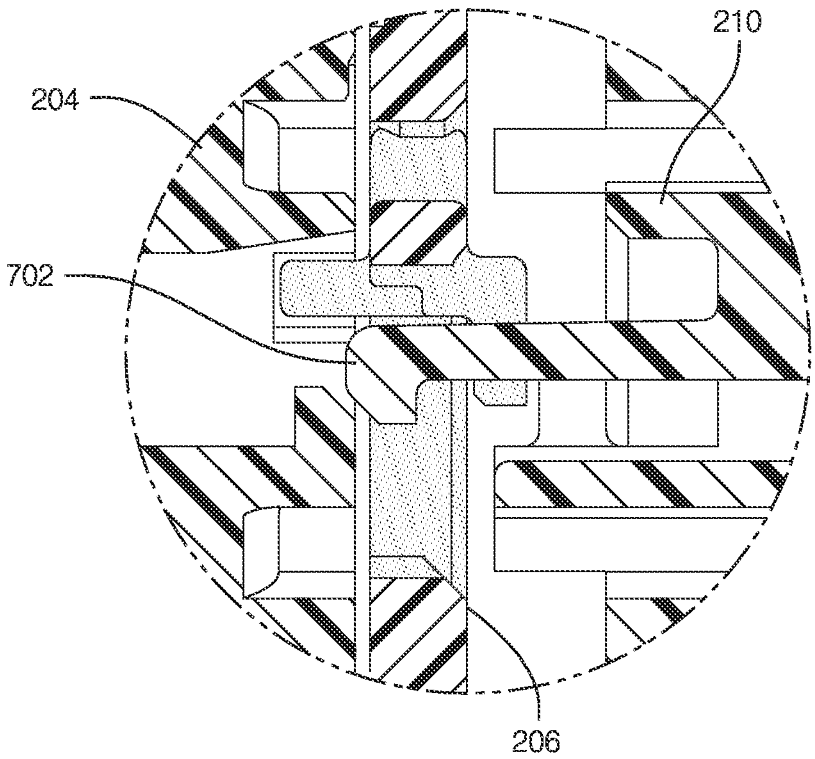
FIG. 7B shows a close-up of the cross-section view of FIG. 7A according to the first embodiment.
Figure 8:
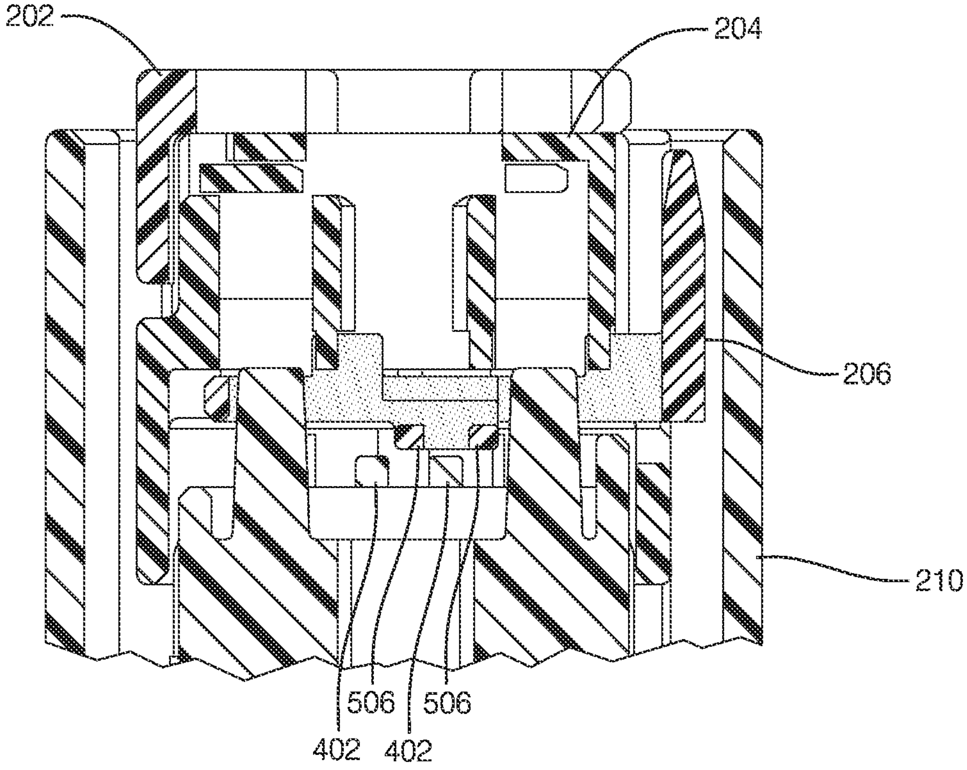
FIG. 8 shows a cross-section view of the connector along section line 8-8 in FIG. 6A according to the first embodiment.

FIG. 7A shows a cross section view of the electrical connector 100 with the ISL 206 in the pre-staged position 602 shown in FIG. 6A. As highlighted in FIG. 7B, the inner housing 204 is attached to the outer housing 210 by a flexible latching arm 702 extending from the outer housing 210 and engaging the inner housing 204. As highlighted in FIG. 8, the housing interlocking tab 402 is offset from the ISL interlocking tab 506 when the ISL 206 is in the pre-staged position 602, thereby allowing relative movement between the inner and outer housings 204, 210.

Figure 9A:
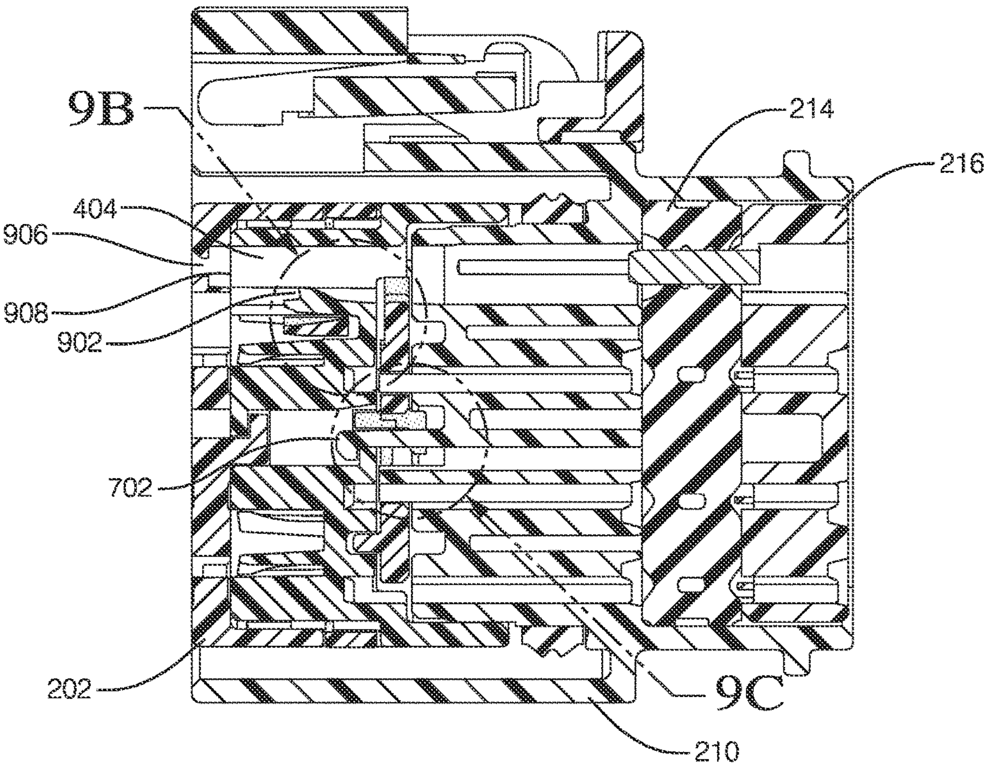
FIG. 9A shows a cross-section view of the connector along section line 9A-9A in FIG. 6A according to the first embodiment.

As shown in FIG. 9A, the inner housing 204 defines a plurality of terminal cavities 404 and a plurality of flexible terminal retaining arms 902 that are configured to retain the electrical terminals within the terminal cavities 404. The nose housing 202 is attached to the inner housing 204. The nose housing 202 defines a plurality of apertures 906 that are arranged and aligned with openings 908 of the terminal cavities 404.

Figure 9B:
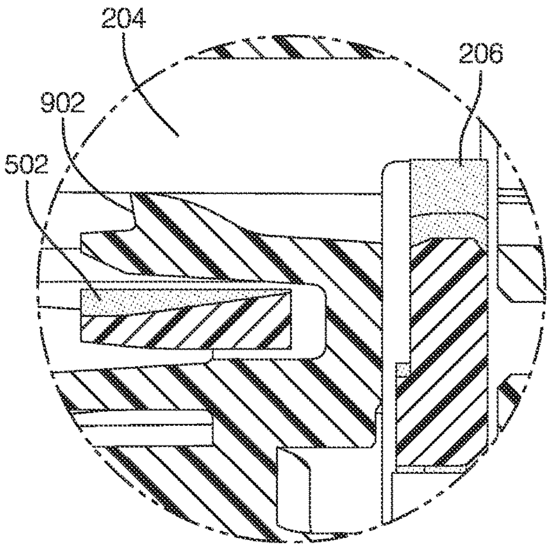
FIG. 9B shows a first close-up of the cross-section view of FIG. 9A according to the first embodiment.
Figure 9C:
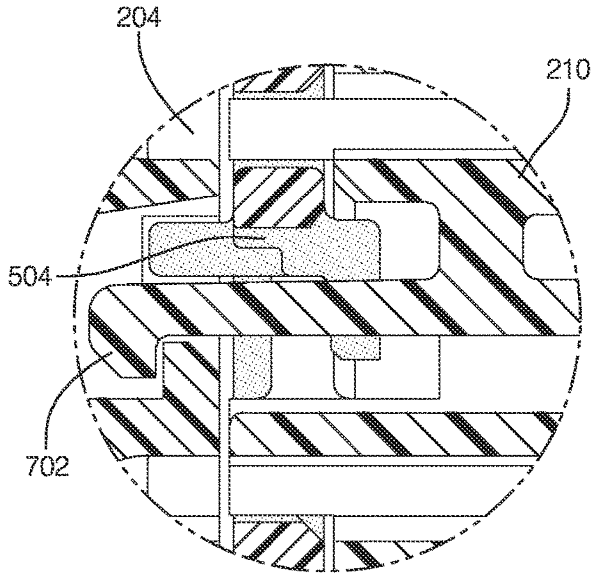
FIG. 9C shows a second close-up of the cross-section view of FIG. 9A according to the first embodiment.

The raised pads 502 are aligned with the terminal retaining arms 902 as shown in FIG. 9B when the ISL 206 is in a fully-staged position 604 within the inner housing 204 by moving the ISL 206 in the direction 606 as shown in FIG. 6B, thereby inhibiting the terminal retaining arms 902 from flexing and inhibiting removal of the electrical terminals from the terminal cavities 404. The tab 504 is also aligned with the flexible latching arm when the ISL 206 is in the fully-staged position 604 as shown in FIG. 9C, thereby inhibiting the flexible latching arm 702 from flexing and disengaging from the inner housing 204. The raised pads 502 inhibit placement of the ISL 206 in the fully-staged position 604 shown in FIG. 6B if one or more of the electrical terminals are not properly retained by one or more of the terminal retaining arms 902. The tab 504 also inhibits placement of the ISL 206 in the fully-staged position 604 if the flexible latching arm 702 is not properly engaged with the inner housing 204.

Figure 10A:
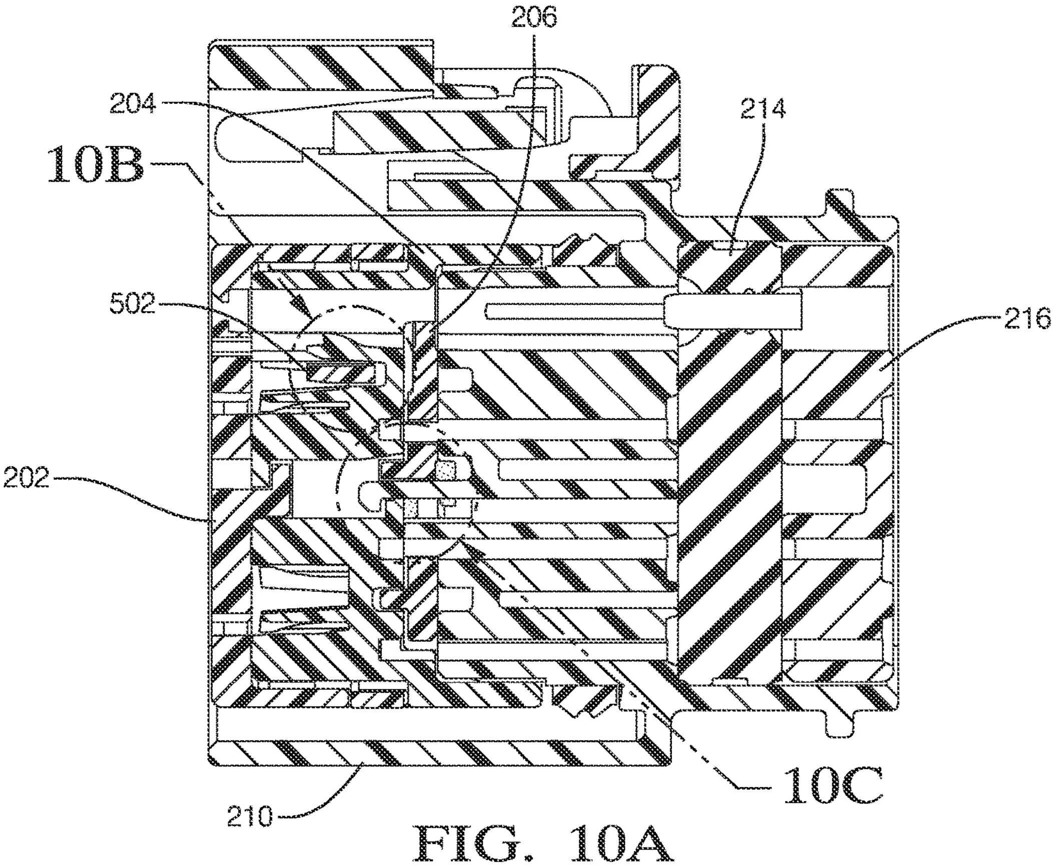
FIG. 10A shows a cross-section view of the connector along section line 10A-10A in FIG. 6B according to the first embodiment.
Figure 10B:
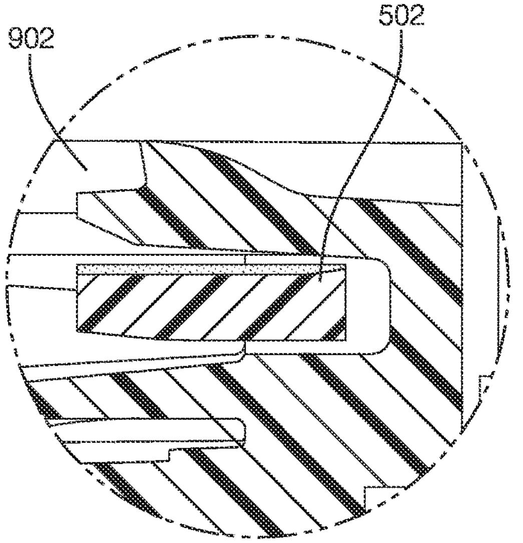
FIG. 10B shows a first close-up of the cross-section view of FIG. 10A according to the first embodiment.
Figure 10C:
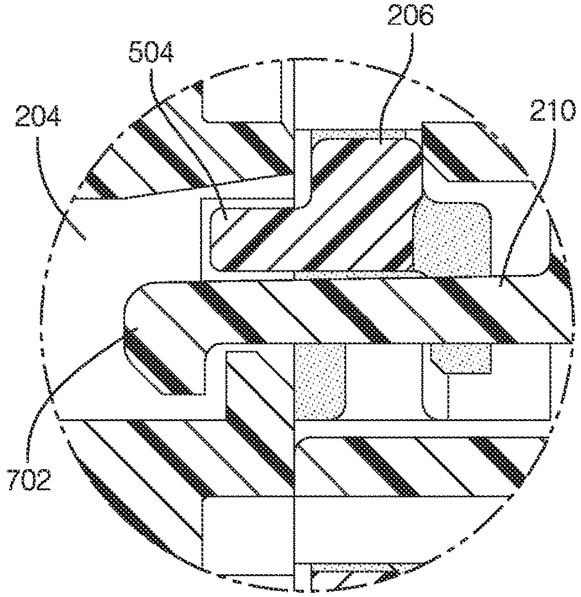
FIG. 10C shows a second close-up of the cross-section view of FIG. 10A according to the first embodiment.

FIG. 10A shows a cross section view of the electrical connector 100 with the ISL 206 in the pre-staged position 602. As highlighted in FIG. 10B, the positioning of the raised pads 502 of the ISL 206 allows the terminal retaining arms 902 to deflect as the terminal is being inserted into the terminal cavities 404. As highlighted in FIG. 10C, the engagement of the flexible latching arm 702 with the inner housing 204 firmly locks the outer housing 210 to the inner housing 204.

Figure 11:
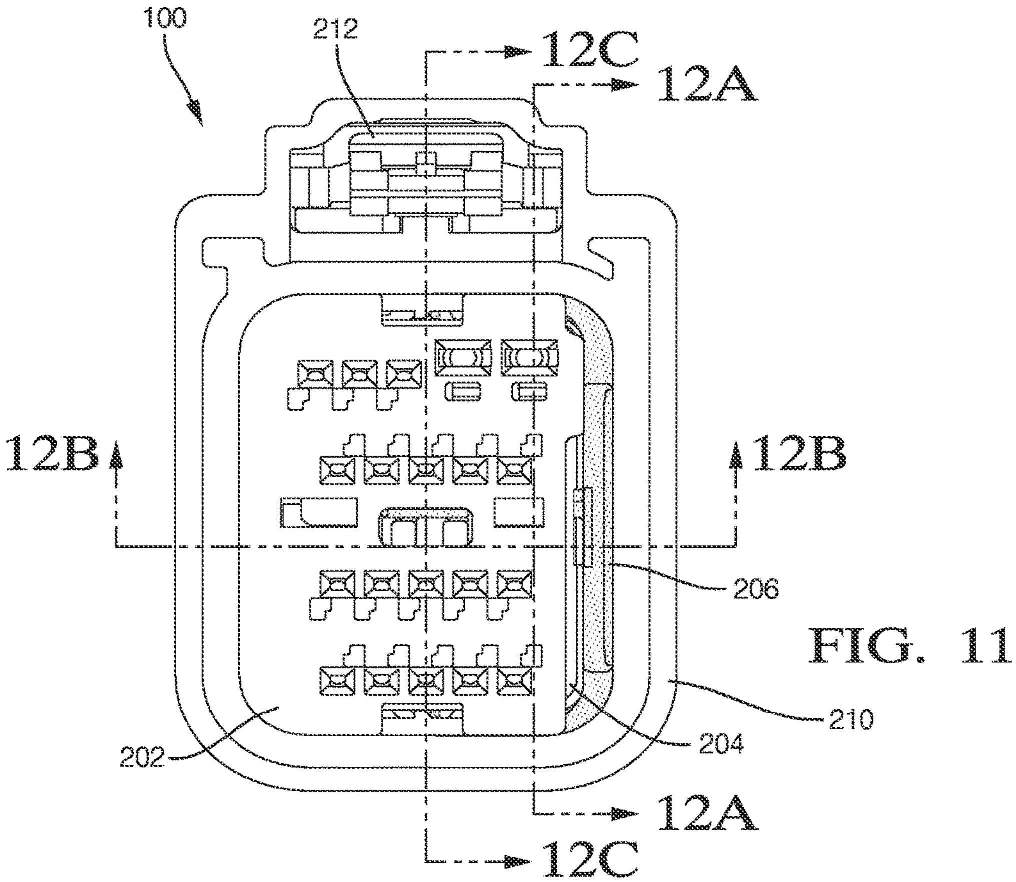
FIG. 11 shows a mating end view of the connector of FIG. 1 with the ISL in a fully-staged condition according to the first embodiment.

FIG. 11 illustrates the electrical connector 100 with the ISL 206 in the fully-staged position 604 as shown in FIG. 6B. FIG. 11 shows the section lines used to create the cross-section view of the electrical connector 100 in FIGS. 12A, 12B, and 12C.

Figure 12A:
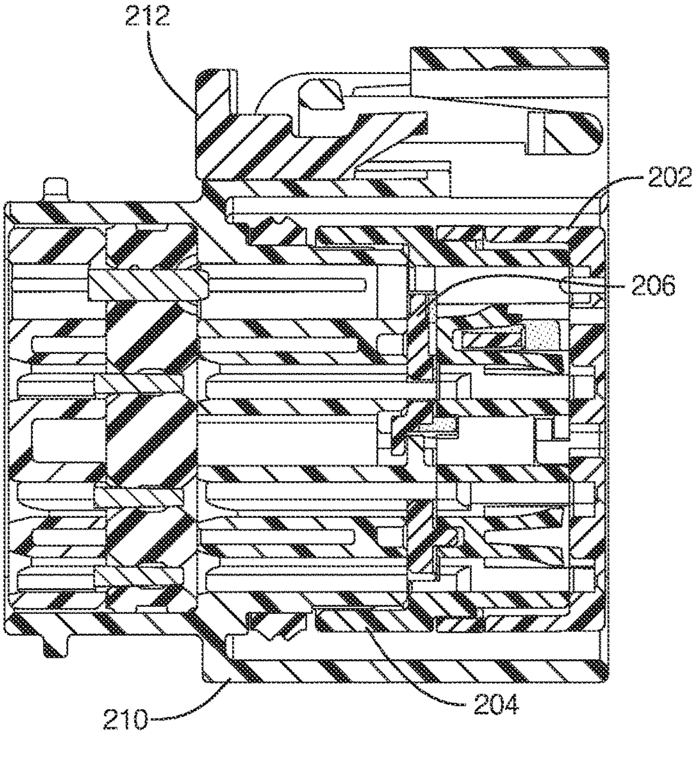
FIG. 12A shows a cross-section view of the connector of FIG. 1 along section line 12A-12A in FIG. 11 according to the first embodiment.
Figure 12B:
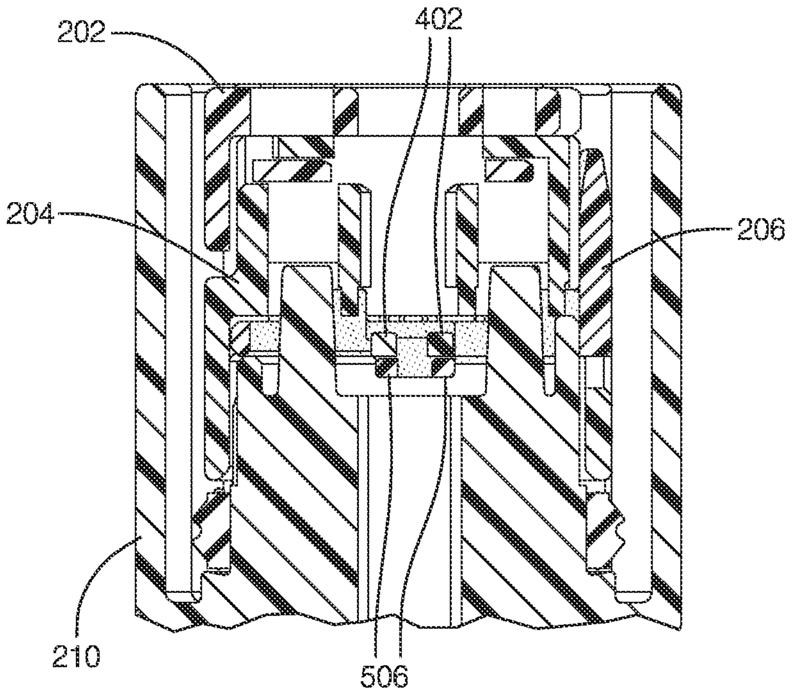
FIG. 12B shows a cross-section view of the connector along section line 12B-12B in FIG. 11 according to the first embodiment.
Figure 12C:
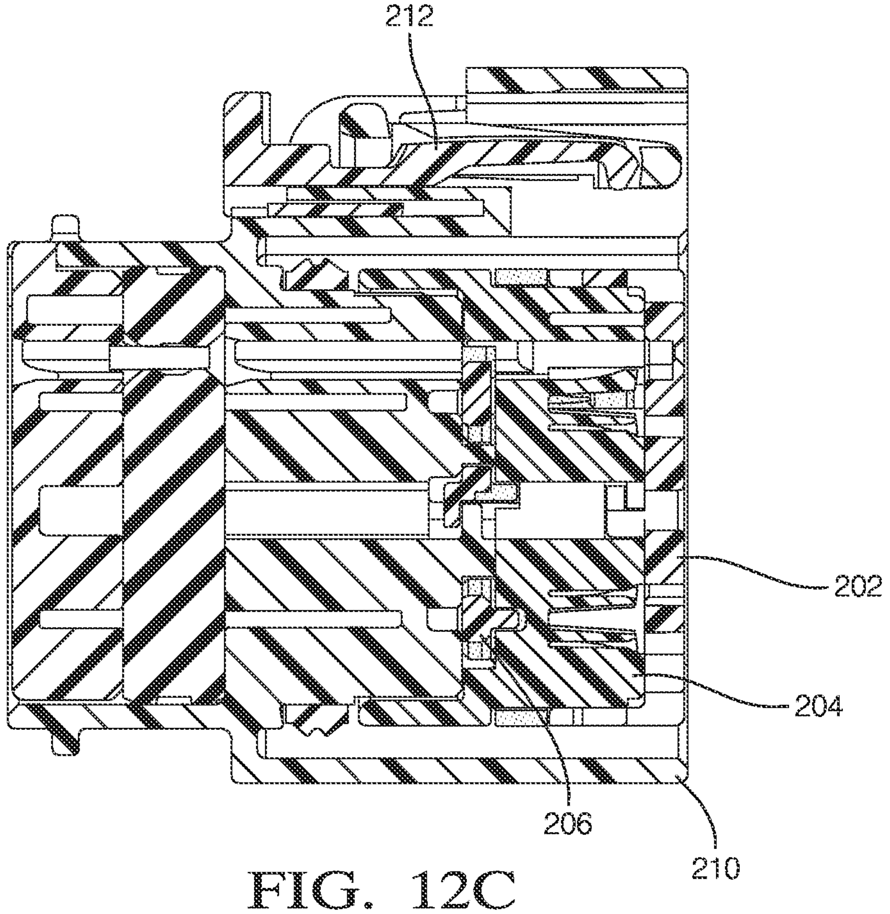
FIG. 12C shows a cross-section view of the connector along section line 12C-12C in FIG. 11 according to the first embodiment.

FIGS. 12A, 12B, and 12C show the interlocking features between the ISL 206, the inner housing 204, and the outer housing 210 when the ISL 206 is in the fully-staged position 604, thereby inhibiting relative movement between the inner and outer housings 210. As shown in FIG. 12B, the ISL 206 defines an ISL interlocking tab 506 extending from the ISL 206. The outer housing 210 defines a corresponding housing interlocking tab 402 extending from the outer housing 210. The ISL interlocking tab 506 is laterally aligned with the housing interlocking tab 402 when the ISL 206 is in the fully-staged position 604 as shown in FIG. 12B, thereby inhibiting longitudinal movement of the outer housing 210 relative to the inner housing 204.

Figure 13A:
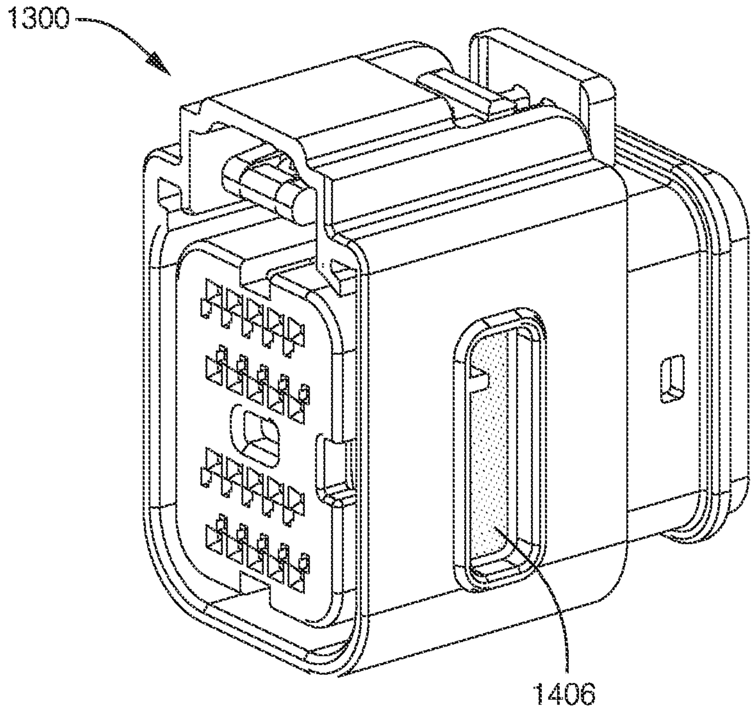
FIG. 13A shows an assembled isometric view of a connector according to a second embodiment.
Figure 13B:
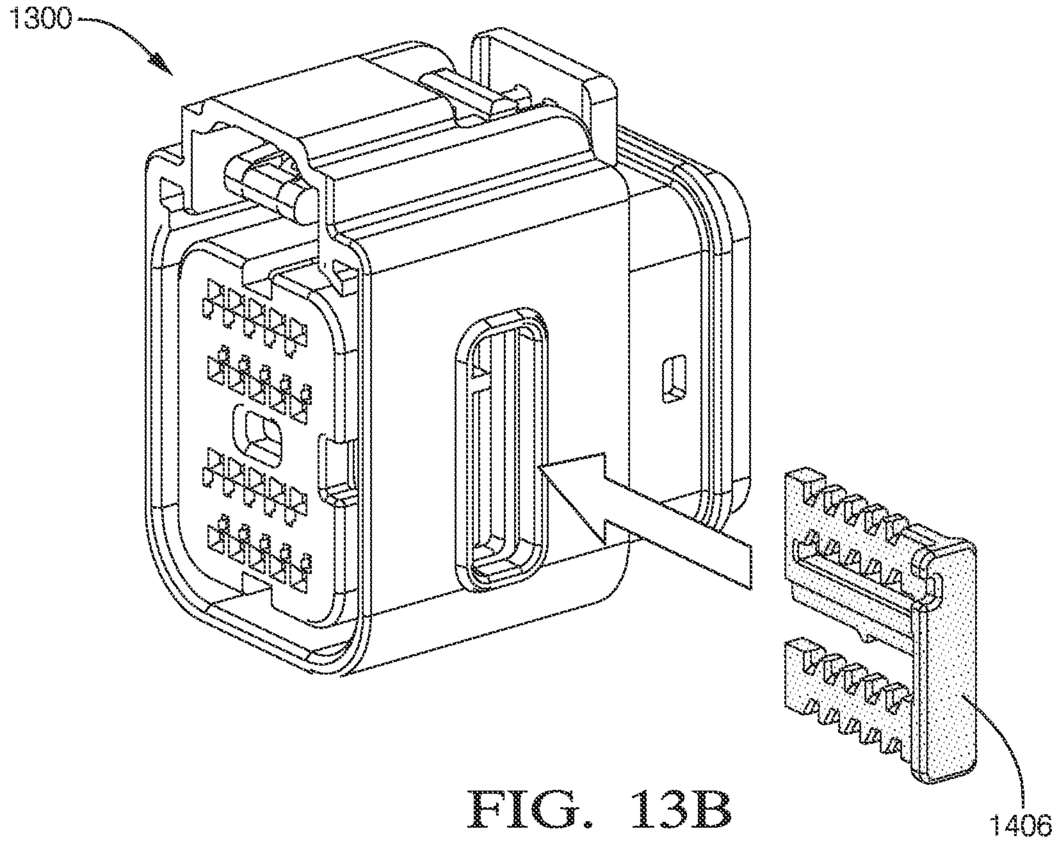
FIG. 13B shows a preassembled isometric view of the connector of FIG. 13A according to a second embodiment.
Figure 14:
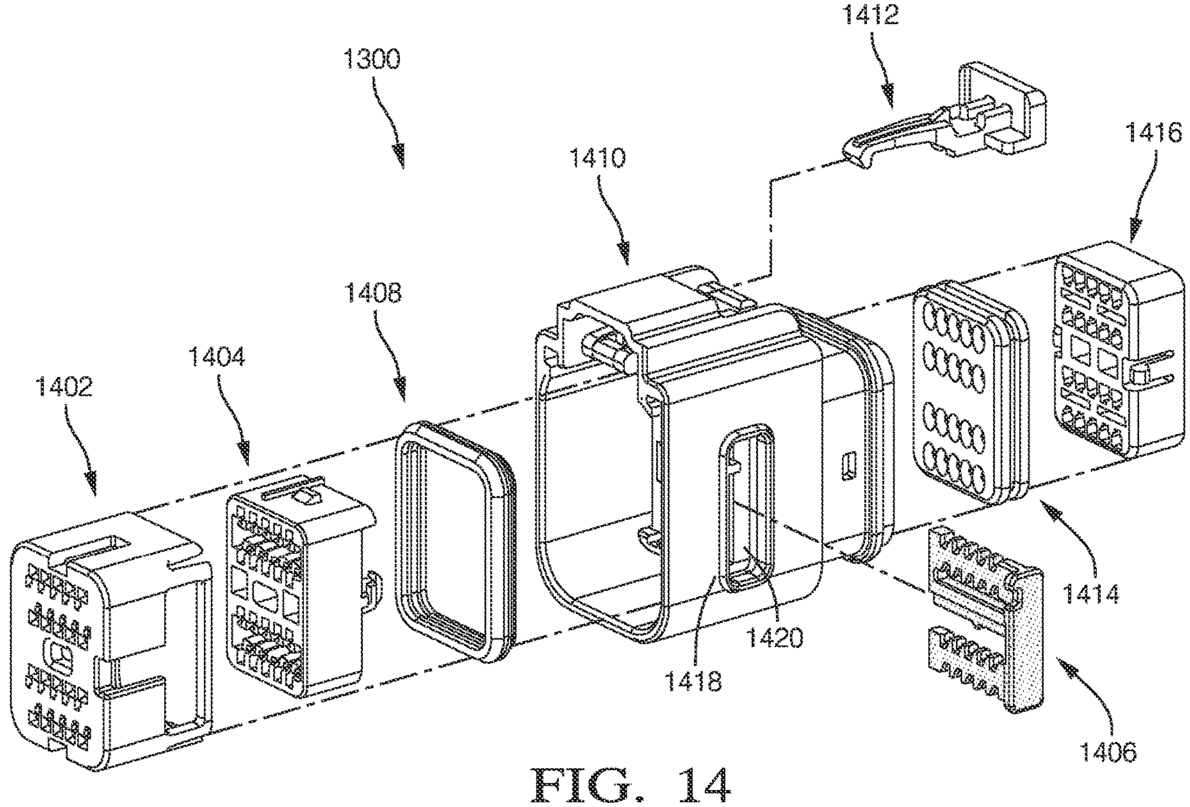
FIG. 14 shows an exploded view of the connector of FIG. 13A according to a second embodiment.

A second example of an electrical connector 1300 similar to electrical connector 100 is shown in the isometric views of FIGS. 13A and 13B. As shown in FIG. 14, the electrical connector 1300 includes a nose housing 1402, an inner housing 1404, a ISL 1406, a connector seal 1408, an outer housing 1410, a connector position assurance device, hereafter referred to as the CPA 1412, a wire seal 1414, and a seal retainer 1416. Alternative embodiments of the electrical connector may be envisioned that do not include the connector seal 1408, the wire seal 1414, and/or the CPA 1412.

Figure 15A:
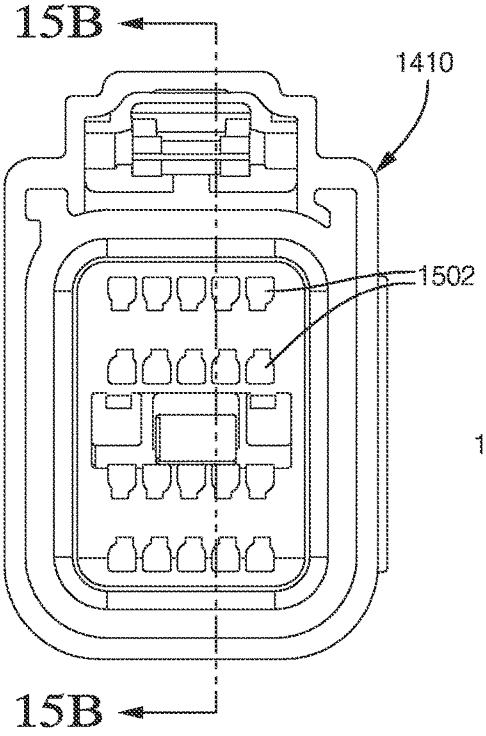
FIG. 15A shows an end view of an outer housing of the connector of FIG. 13A according to the second embodiment.
Figure 15B:
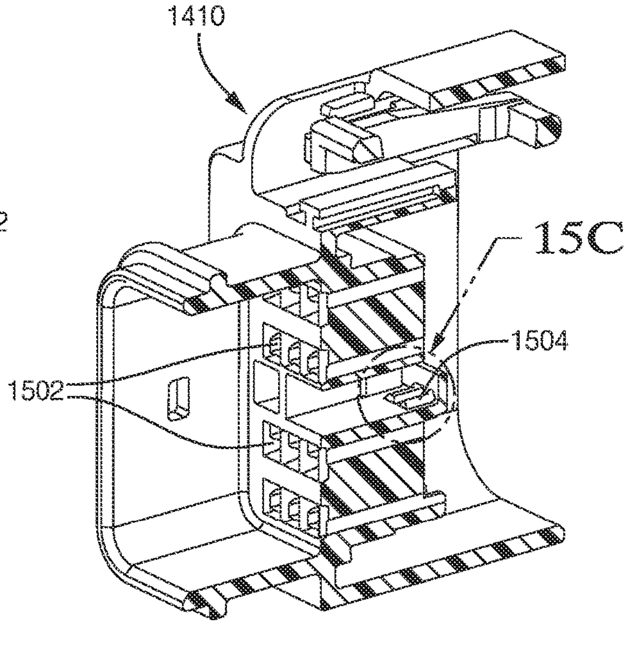
FIG. 15B shows a cross-section view of the connector along section line 15B-15B in FIG. 15A according to the second embodiment.
Figure 15C:
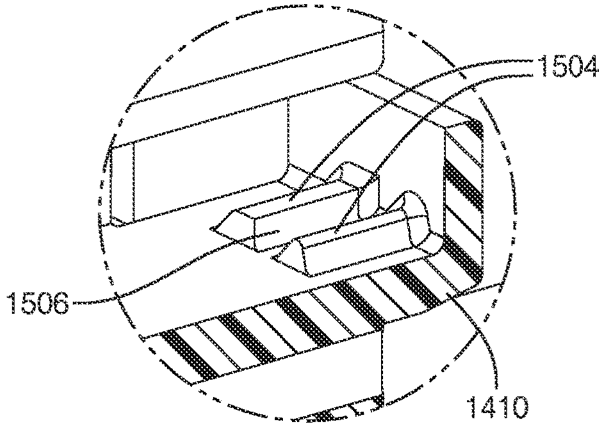
FIG. 15C shows a close-up of the cross-section view of FIG. 15B according to the second embodiment.

FIG. 15A is an isometric view of the outer housing 1410 showing the section line for the cross section view of FIG. 15B. As shown in FIG. 15B, the outer housing 1410 defines first protrusions, hereafter referred to as the housing interlocking tabs 1502 extending in a longitudinal direction, i.e., in a direction substantially parallel to the independent secondary lock insertion axes into the connector assembly. FIG. 15C is a close-up view of the housing interlocking tabs 1504.

Figure 16A:
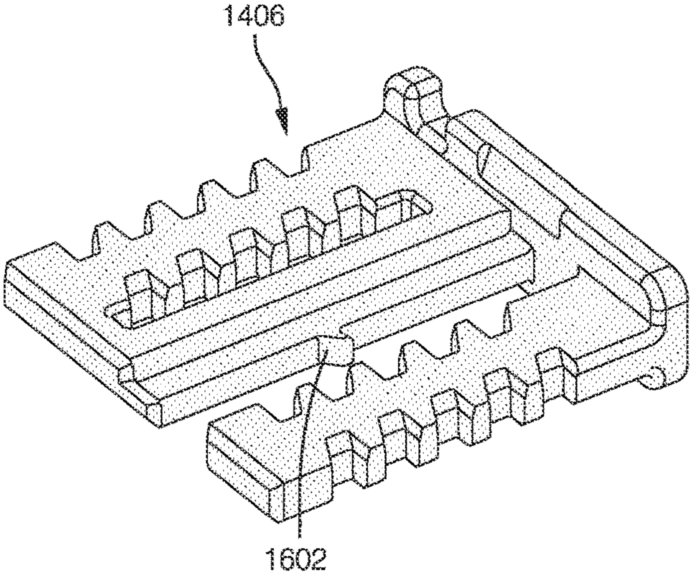
FIG. 16A shows an isometric view of an Independent Secondary Lock (ISL) of the connector of FIG. 13A according to the second embodiment.
Figure 16B:
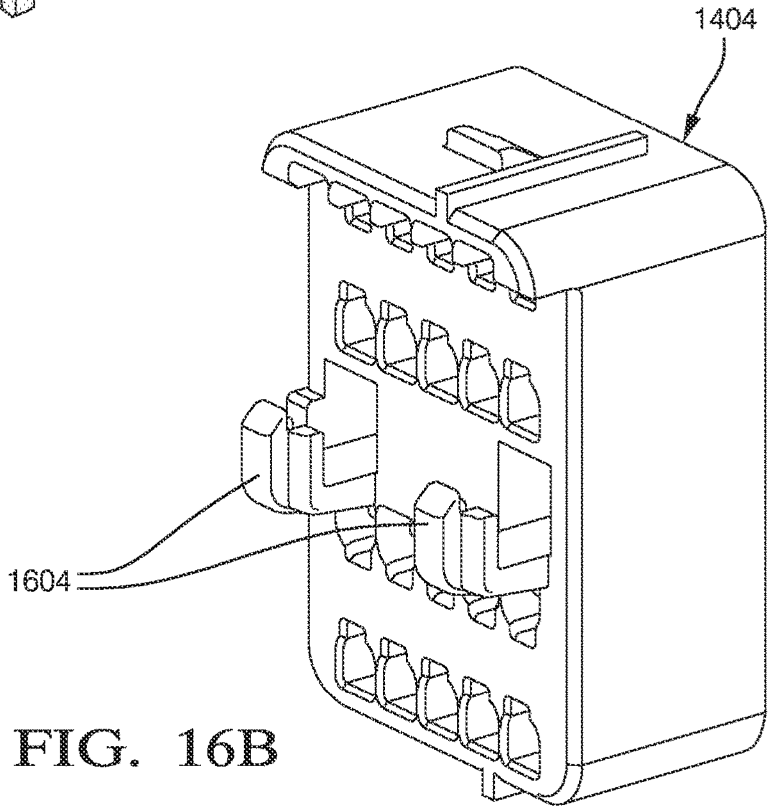
FIG. 16B shows an isometric view of an inner connector of the connector of FIG. 13A according to the second embodiment.

As shown in FIG. 16A, the ISL 1406 defines an ISL interlocking tab 1602. FIG. 16B shows a rear isometric view of the inner housing 1404. As shown in FIG. 16B, the inner housing 1404 defines inner housing interlocking features 1604 in the form of L-shaped hooks projecting from the rear surface of the inner housing 1404.

Figure 17A:
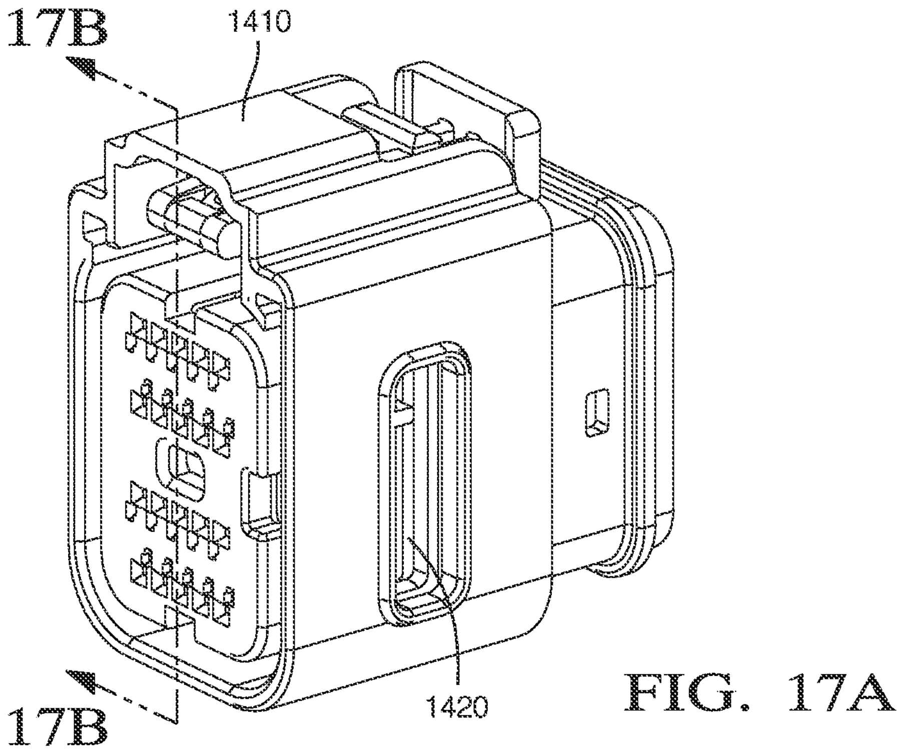
FIG. 17A shows an isometric view of the connector as in FIG. 13B prior to insertion of the ISL of FIG. 16A according to the second embodiment.
Figure 17B:
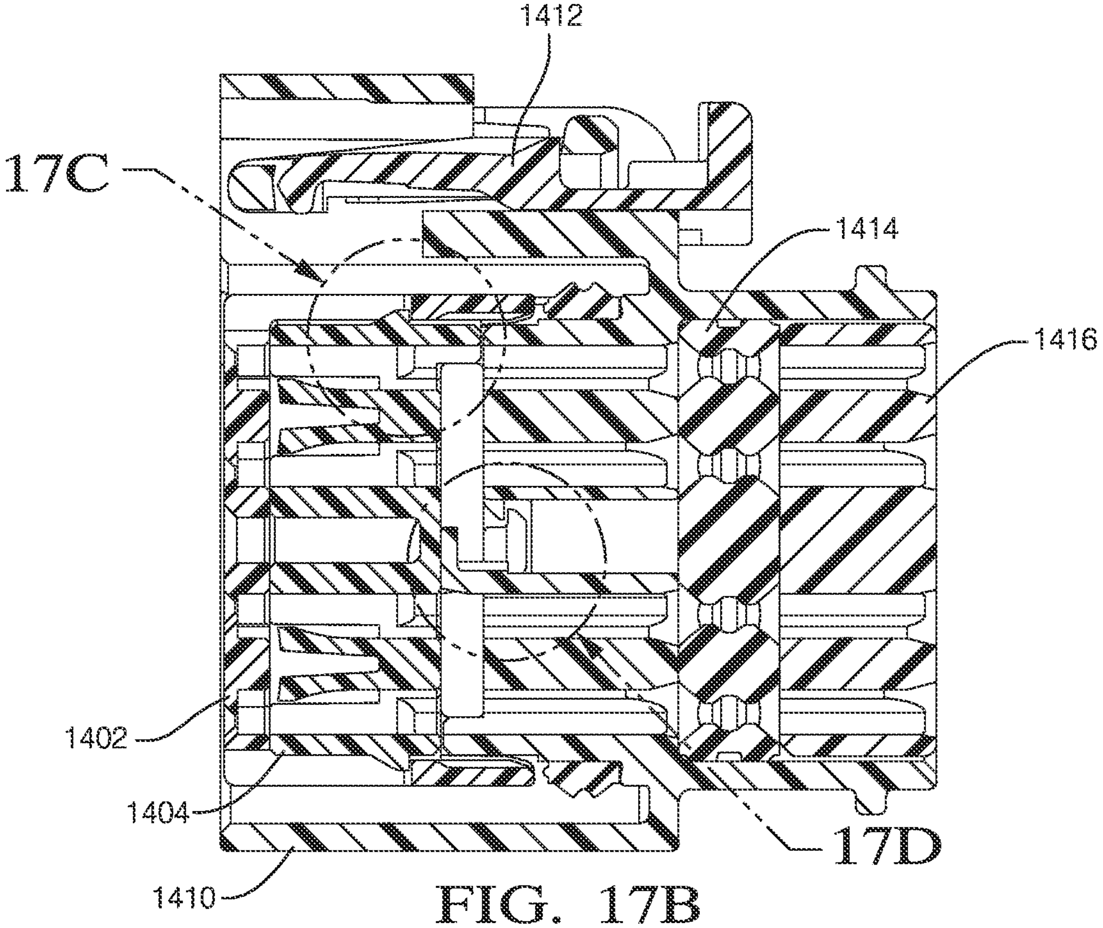
FIG. 17B shows a cross-section view of the connector of FIG. 13A along section line 17B-17B in FIG. 17A according to the second embodiment.
Figure 17C:
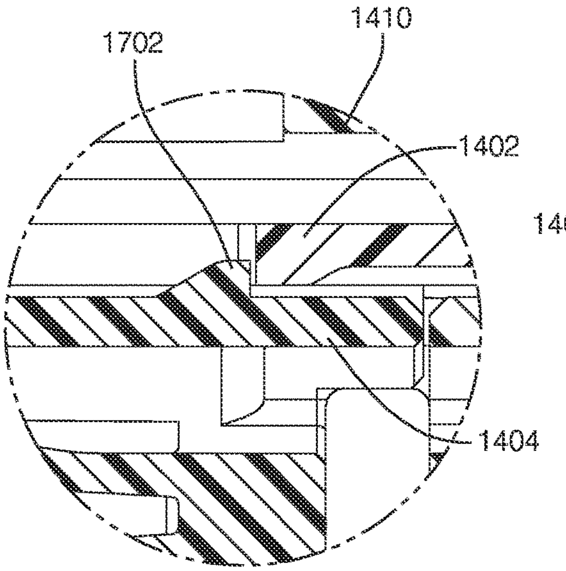
FIG. 17C shows a first close-up of the cross-section view of FIG. 17B according to the second embodiment.
Figure 17D:
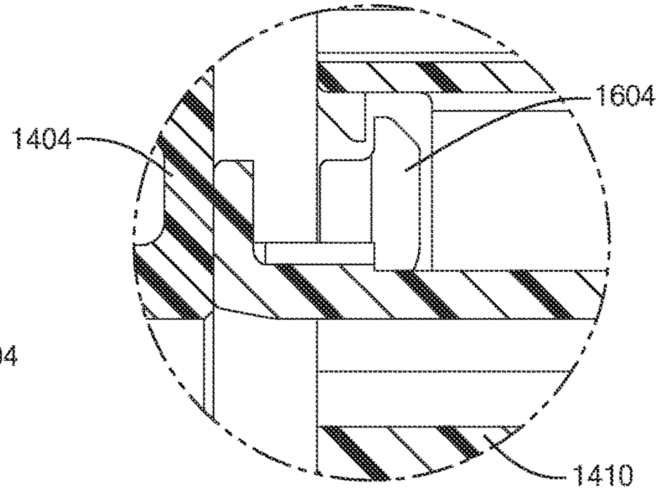
FIG. 17D shows a second close-up of the cross-section view of FIG. 17B according to the second embodiment.

FIG. 17A shows an isometric view of the electrical connector 1300 prior to insertion of the ISL 1406. FIG. 17B is a cross section view of the electrical connector 1300 along the section line 17B-17B shown in FIG. 17A. FIG. 17C is a close up view of FIG. 17B showing a first locking feature 1702 configured to secure the nose housing 1404 to the inner housing 1410 in greater detail and FIG. 17D is a close up view of FIG. 17B showing the inner housing interlocking features 1604 configured to secure the inner housing 1404 to the outer housing 1410 in greater detail.

Figure 18:
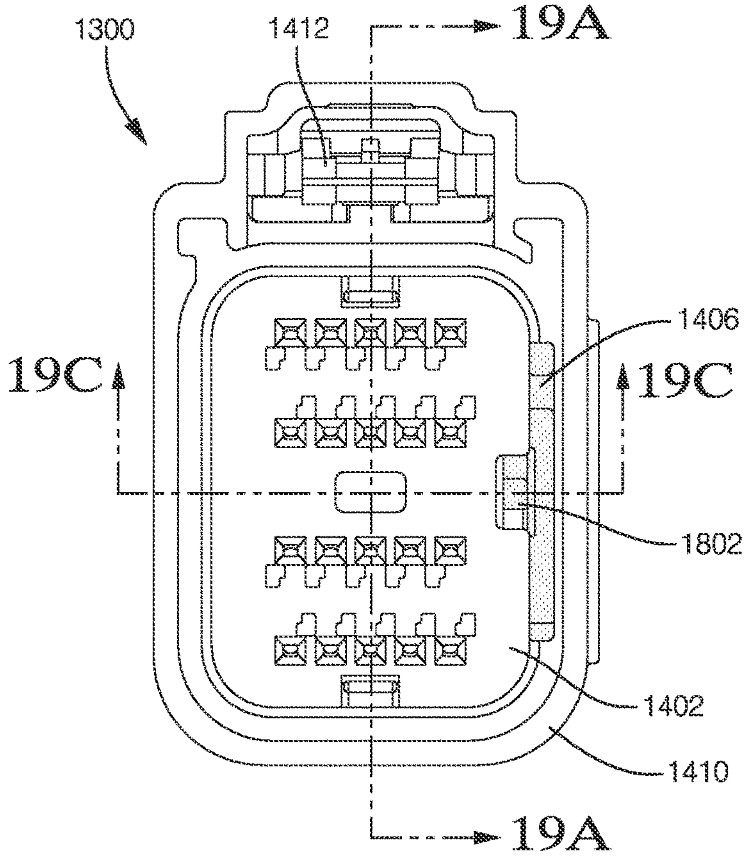
FIG. 18 shows a mating end view of the connector as in FIG. 13A with the ISL of FIG. 16A in a pre-staged position according to the second embodiment.

FIG. 18 is an end view of the electrical connector 1300 after the ISL 1406 is inserted in the electrical connector 1300 in a pre-staged position 1802 through a first aperture 1420 in a first sidewall 1418. While in the pre-staged position 1802, the ISL interlocking tab 1602 is disposed between the housing interlocking tabs 1504 and inner housing interlocking features 1604. FIG. 18 also illustrates the section lines used to create the cross-section view of the electrical connector 1300 in FIGS. 19A and 19C.

Figure 19A:
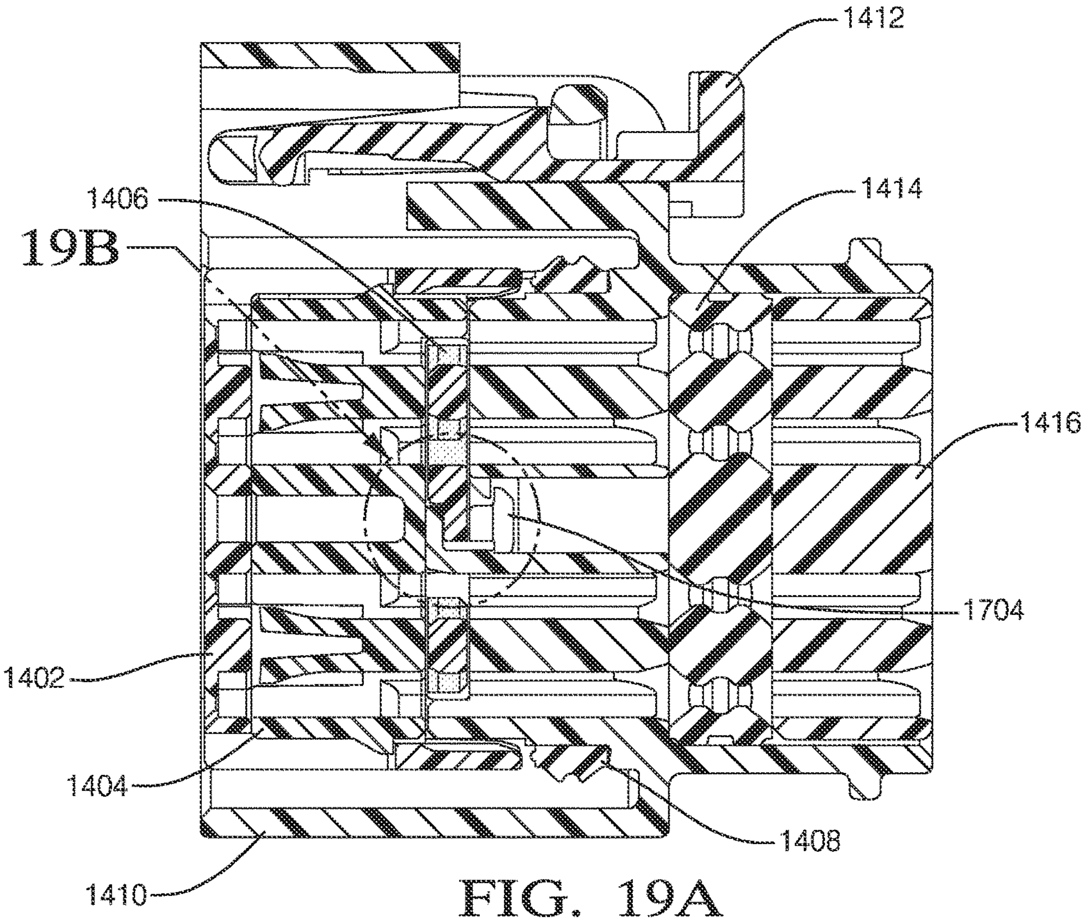
FIG. 19A shows a cross-section view of the connector of FIG. 13A along section line 19A-19A in FIG. 18 according to the second embodiment.
Figure 19B:
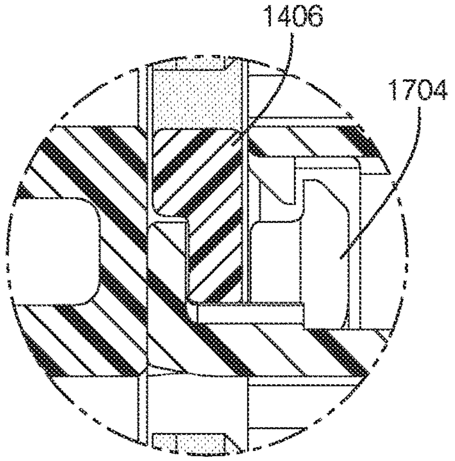
FIG. 19B shows a close-up of the cross-section view of FIG. 19A according to the second embodiment.
Figure 19C:
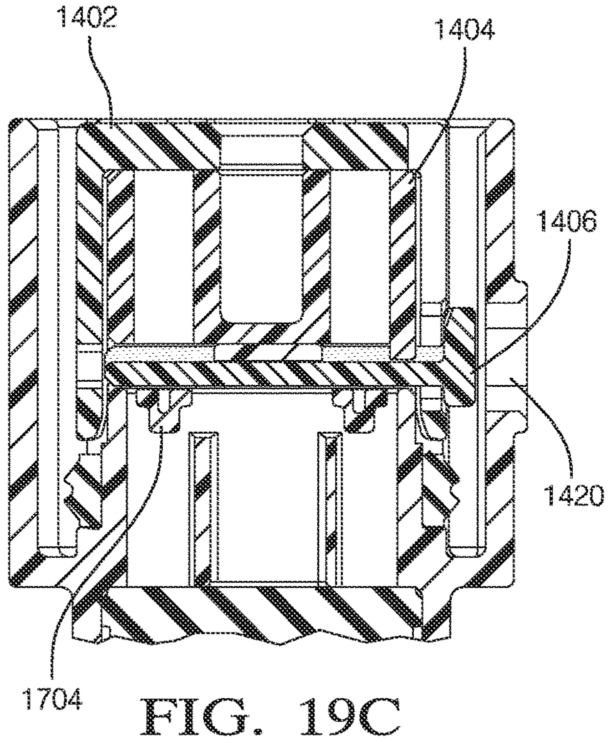
FIG. 19C shows a cross-section view of the connector of FIG. 13A along section line 19C-19C in FIG. 18 according to the second embodiment.

FIG. 19A shows a cross section view of the electrical connector 1300 with the ISL 1406 in the pre-staged position 1802. FIG. 19B is a close up view of FIG. 19A showing the ISL 1406 interlocked with the outer housing 1410 when the ISL 1406 is in the pre-staged position 1802 in greater detail and FIG. 19C is a close up view of FIG. 19A showing the ISL 1406 in the pre-staged position 1802 between the inner housing 1404 and the outer housing 1410, thereby securing and interlocking the inner housing 1404 to the outer housing 1410 in greater detail.

Figure 20:
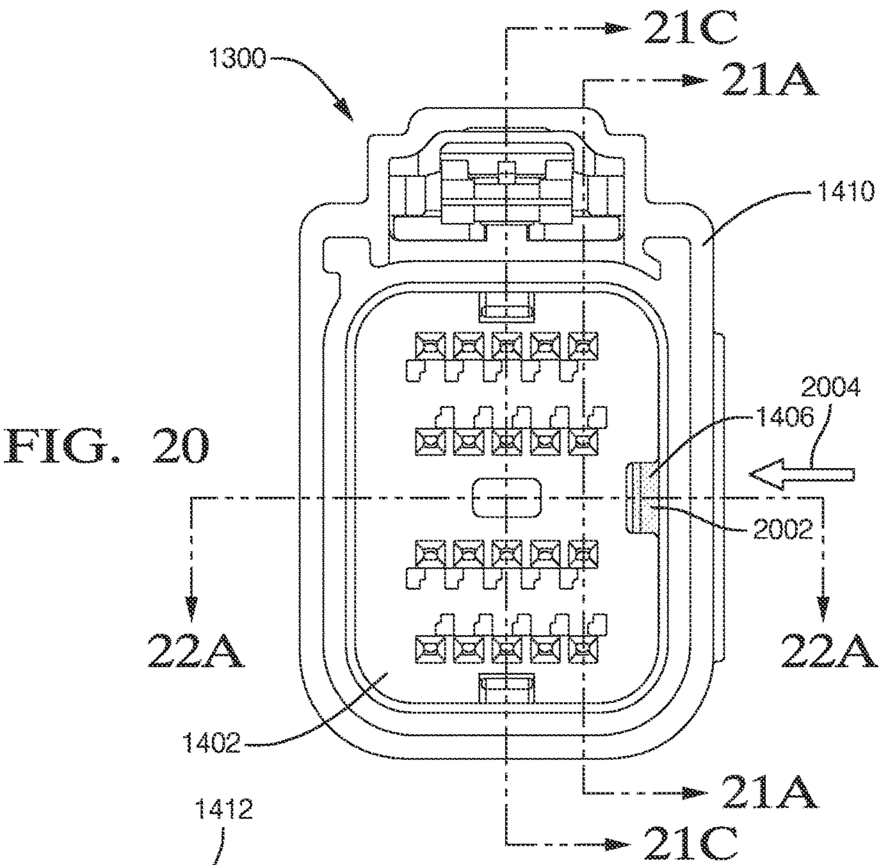
FIG. 20 shows a mating end view of the connector as in FIG. 13A with the ISL of FIG. 16A in a fully-staged position according to the second embodiment.

FIG. 20 is an end view of the electrical connector 1300 after the ISL 1406 is inserted in the electrical connector 1300 and moved to a fully-staged position 2002 by moving the ISL 1406 in the direction 2004 shown in FIG. 20. When the ISL 1406 is moved from the pre-staged position 1802 to the fully-staged position 2002, the ISL interlocking tab 1602 is displaced from the channel 1506 between the housing interlocking tabs 1504 and inner housing interlocking features 1604. FIG. 20 also illustrates the section lines used to create the cross-section view of the electrical connector 1300 in FIGS. 21A, 21C, and 22A.

Figure 21A:
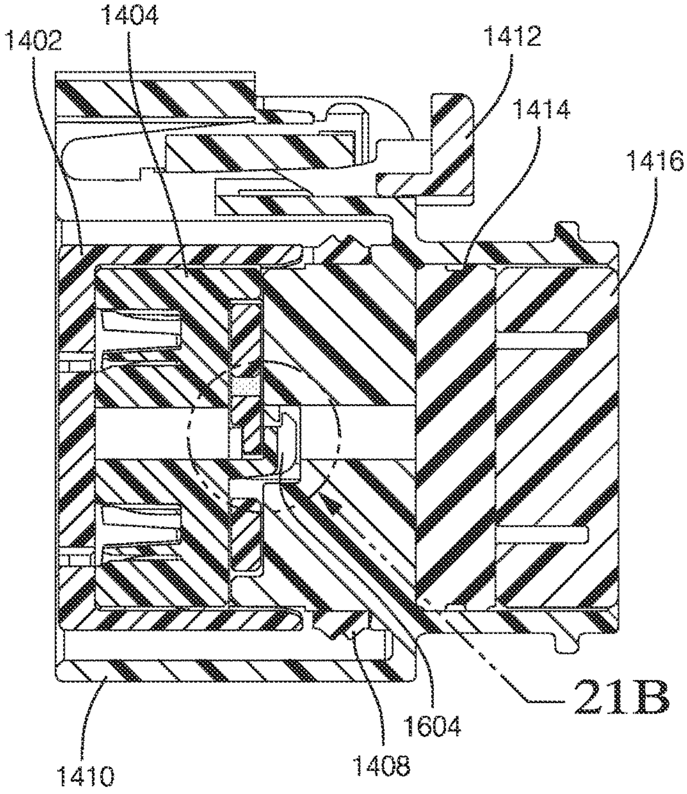
FIG. 21A shows a cross-section view of the connector of FIG. 13A along section line 21A-21A in FIG. 20 according to the second embodiment.
Figure 21B:
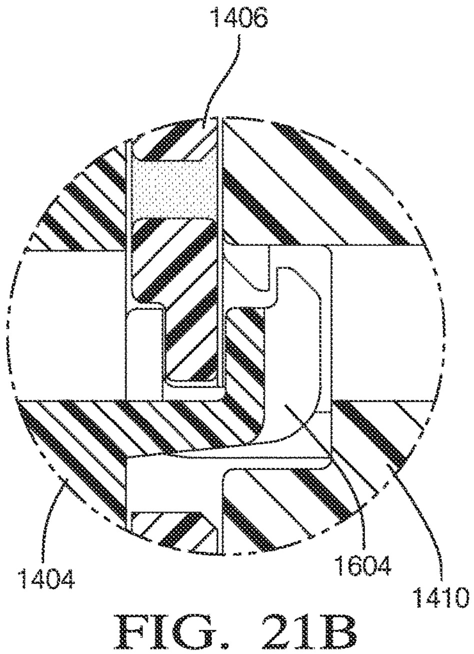
FIG. 21B shows a close-up of the cross-section view of FIG. 21A according to the second embodiment.
Figure 21C:
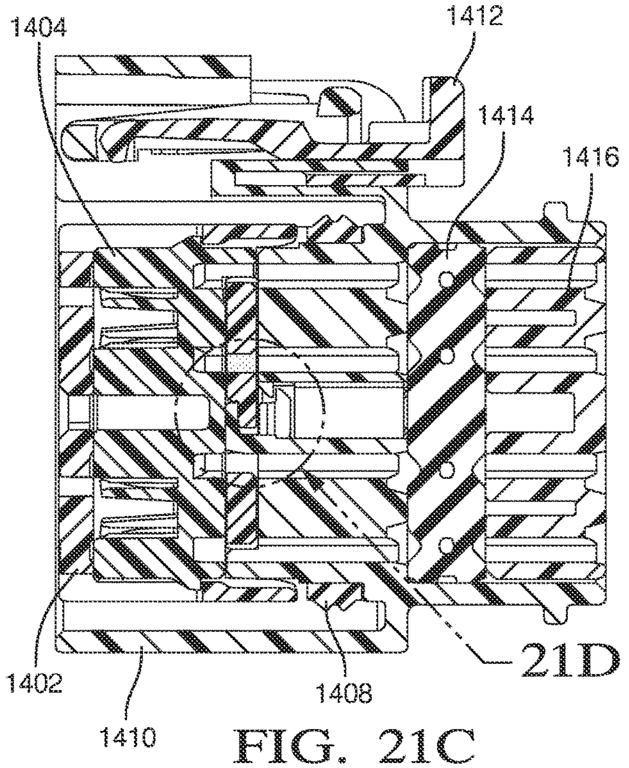
FIG. 21C shows a cross-section view of the connector of FIG. 13A along section line 21C-21C in FIG. 20 according to the second embodiment.
Figure 21D:
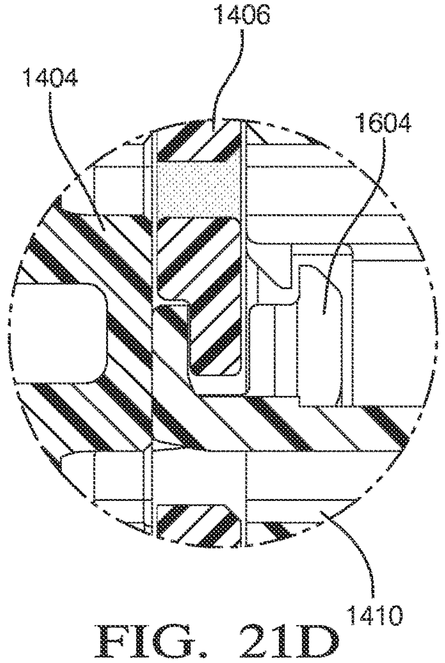
FIG. 21D shows a close-up of the cross-section view of FIG. 21C according to the second embodiment.

FIG. 21A shows a cross section view of the electrical connector 1300 with the ISL 1406 in the fully-staged position 2002. FIG. 21B is a close up view of FIG. 21A showing the ISL 1406 interlocked with the outer housing 1410 when the ISL 1406 is in the fully-staged position 2002 in greater detail. FIG. 21C shows another cross section view of the electrical connector 1300 with the ISL 1406 in the fully-staged position 2002. FIG. 21D is a close up view of FIG. 21C showing the ISL 1406 secured in the fully-staged position 2002 and interlocking the inner housing 1404 to the outer housing 1410 in greater detail.

Figure 22A:
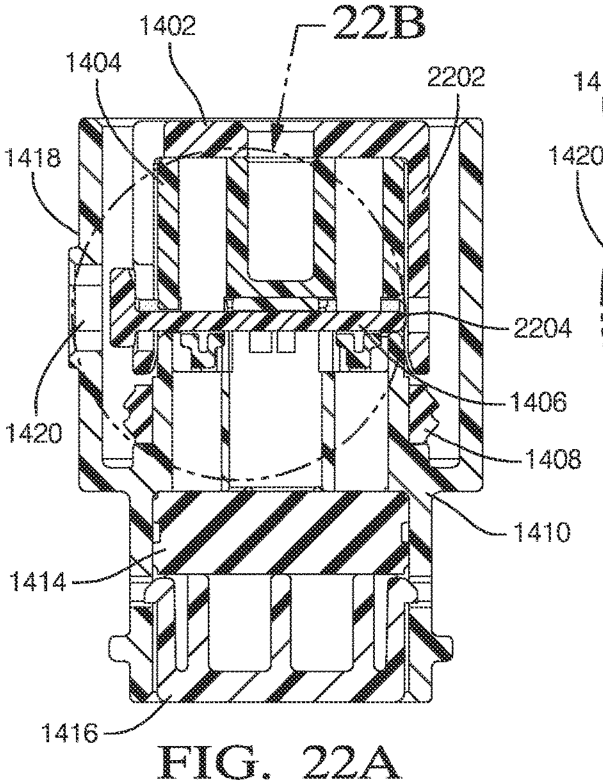
FIG. 22A shows a cross-section view of the connector of FIG. 13A along section line 22A-22A in FIG. 20 according to the second embodiment.
Figure 22B:
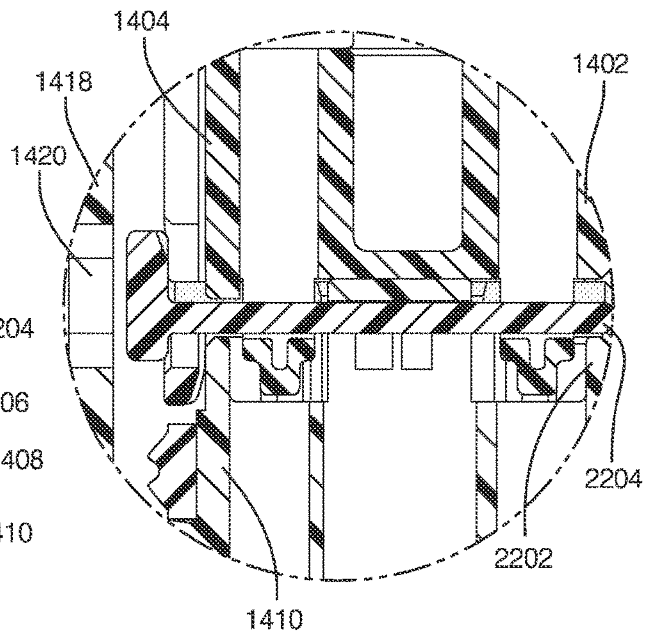
FIG. 22B shows a close-up of the cross-section view of FIG. 22A according to the second embodiment.

FIG. 22A shows yet another cross section view of the electrical connector 1300 with the ISL 1406 in the fully-staged position 2002. FIG. 22B is a close up view of FIG. 22A showing the ISL 1406 secured in the fully-staged position 2002 and interlocking the inner housing 1404 and the nose housing 1402 to the outer housing 1410 in greater detail. A second sidewall 2202 of the nose housing 1402 opposite the first sidewall 1418 of the outer housing 1410 defines a second aperture 2204 into which an end of the ISL 1406 is inserted when the ISL 1406 is in the fully-staged position 2002.

Figure 23:
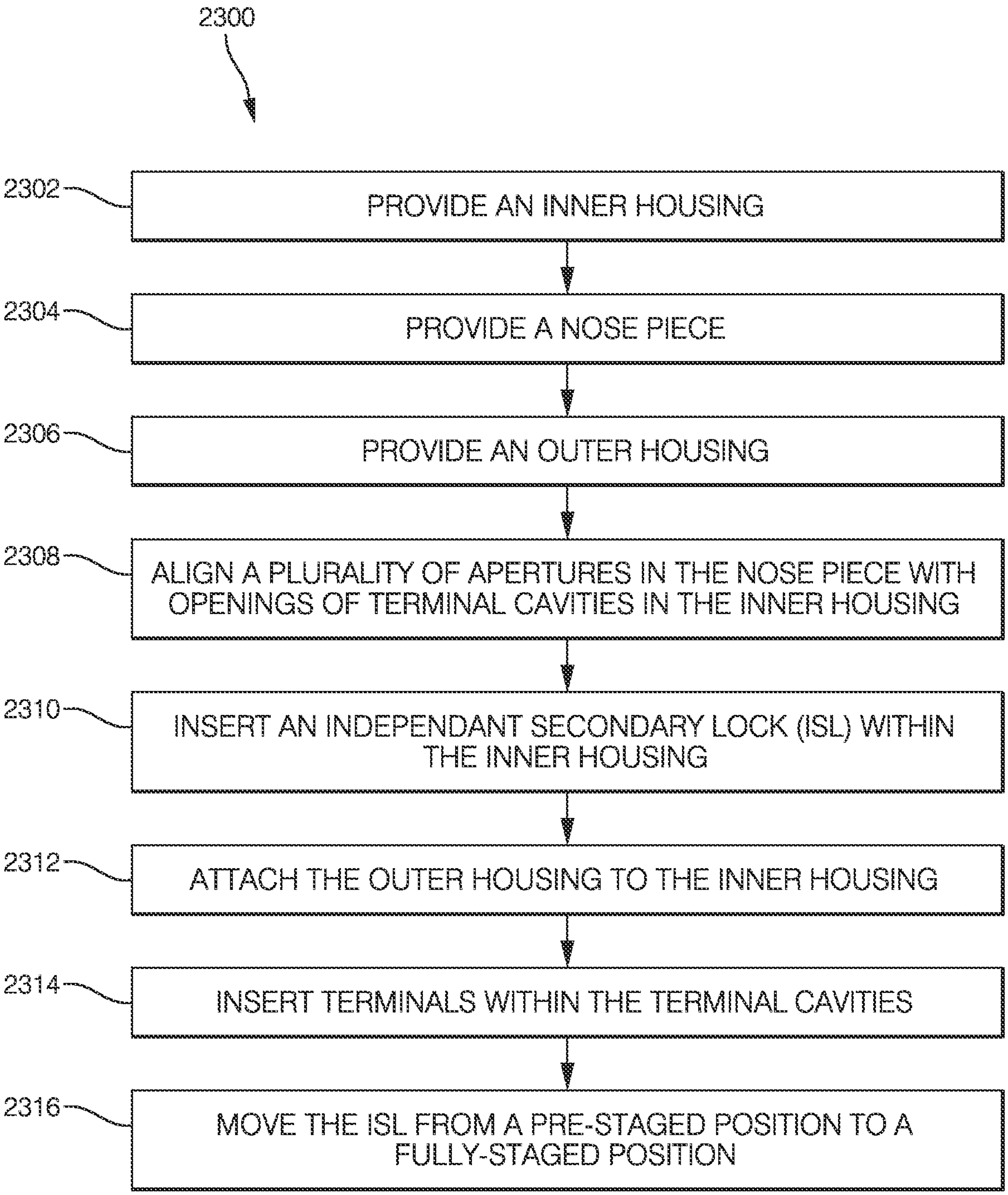
FIG. 23 shows a flow chart of a method of assembling an electrical connector according to some embodiments.

A method 2300 of assembling an electrical connector such as electrical connector 100 or electrical connector 1300 is shown in FIG. 23. The method 2300 includes the following steps.

At STEP 2302, an inner housing is provided. In some embodiments, this step includes providing an inner housing 204 defining a plurality of terminal cavities 404 and a plurality of flexible terminal retaining arms 902 configured to retain the electrical terminals within the terminal cavities 404.

At STEP 2304, a nose housing is provided. In some embodiments, this step includes providing a nose housing 202 defining a plurality of apertures.

At STEP 2306, an outer housing 210 is provided. In some embodiments, this step includes providing an outer housing 210 having flexible latching arm extending from the outer housing 210.

At STEP 2308, the plurality of apertures are aligned with openings of the terminal cavities 404. In some embodiments, this step includes aligning the plurality of apertures with openings of the terminal cavities 404 and attaching the nose housing 202 to the inner housing 204.

At STEP 2310, a ISL 206 is inserted within the inner housing 204. In some embodiments, this step includes inserting an ISL 206 defining a plurality of raised pads 502 and a tab 504 within the inner housing 204 and placing it in a pre-staged position 602.

In some embodiments, STEP 2310 further includes inserting the ISL 1406 through a first aperture 1420 in a first sidewall 1418 of the outer housing 1410.

In some embodiments, STEP 2310 further includes inserting an end of the ISL 1406 in a second aperture 2204 of a second sidewall 2202 of the nose housing 1402 arranged opposite the first sidewall 1418 of the outer housing 1410.

At STEP 2312, the outer housing 210 is attached to the inner housing 204. In some embodiments, this step includes attaching the outer housing 210 to the inner housing 204 by engaging the flexible latching arm with the inner housing 204. The tab 504 is offset from the flexible latching arm when the ISL 206 is in the pre-staged position 602, thereby allowing the flexible latching arm to flex as it engages with the inner housing 204.

At STEP 2314, the electrical terminals are inserted within the terminal cavities 404. In some embodiments, this step includes inserting the electrical terminals within the terminal cavities 404. The raised pads 502 are offset from the terminal retaining arms 902 when the ISL 206 is in the pre-staged position 602, thereby allowing the terminal retaining arms 902 to flex as the electrical terminals are inserted within the terminal cavities 404.

At STEP 2316, the ISL 206 is moved from the pre-staged position 602 to a fully-staged position 604. In some embodiments, this step includes moving the ISL 206 from the pre-staged position 602 to a fully-staged position 604, wherein the raised pads 502 are aligned with the terminal retaining arms 902, thereby inhibiting the terminal retaining arms 902 from flexing and inhibiting removal of the electrical terminals from the terminal cavities 404 and wherein the tab 504 is aligned with the flexible latching arm, thereby inhibiting the flexible latching arm from flexing and disengaging from the inner housing 204.

In some embodiments, STEP 2316 is inhibited if one or more of the electrical terminals are not properly retained by one or more of the terminal retaining arms 902.

In some embodiments, STEP 2316 is inhibited if the flexible latching arm is not properly engaged with the inner housing 204.

In some embodiments, the outer housing 210 defines a first protrusion, e.g., housing interlocking tab 402, extending in the first lateral direction and the ISL 206 defines a second protrusion, e.g., the ISL interlocking tab 506, extending in the second lateral direction. The housing interlocking tab 402 is offset from the ISL interlocking tab 506 when the ISL 206 is in the pre-staged position 602, thereby allowing relative movement between the inner and outer housings 204, 210. The housing interlocking tab 402 is aligned with the ISL interlocking tab 506 when the ISL 206 is in the fully-staged position 604, thereby inhibiting relative movement between the inner and outer housings 204, 210.

Discussion of Possible Embodiments

The following are non-exclusive descriptions of possible embodiments of the present invention.

The electrical connector of the preceding paragraph can optionally include, additionally and/or alternatively any, one or more of the following features, configurations and/or additional components.

In some aspects, the techniques described herein relate to an electrical connector, including: an inner housing defining a plurality of terminal cavities and a plurality of flexible terminal retaining arms configured to retain electrical terminals within the terminal cavities; a nose housing attached to the inner housing and defining a plurality of apertures arranged and aligned with openings of the terminal cavities; an independent secondary lock defining a plurality of raised pads and a tab, the independent secondary lock configured to be disposed within the inner housing; and an outer housing to which the inner housing is attached by a flexible latching arm extending from the outer housing and engaging the inner housing, wherein the raised pads are aligned with the terminal retaining arms when the independent secondary lock is in a fully-staged position within the inner housing, thereby inhibiting the terminal retaining arms from flexing and inhibiting removal of the electrical terminals from the terminal cavities and wherein the tab is aligned with the flexible latching arm when the independent secondary lock is in the fully-staged position, thereby inhibiting the flexible latching arm from flexing and disengaging from the inner housing.

The electrical connector of the preceding paragraph can optionally include, additionally and/or alternatively any, one or more of the following features, configurations and/or additional components.

In some aspects, the techniques described herein relate to an electrical connector, wherein the independent secondary lock is slidably attached to the inner housing and is moveable from a pre-staged position to the fully-staged position, wherein the pads are offset from the terminal retaining arms when the independent secondary lock is in the pre-staged position within the inner housing, thereby allowing the terminal retaining arms to flex as the electrical terminals are inserted within the terminal cavities and wherein the tab is offset from the flexible latching arm when the independent secondary lock is in the pre-staged position, thereby allowing the flexible latching arm to flex as it engages with the inner housing.

In some aspects, the techniques described herein relate to an electrical connector, wherein placement of the independent secondary lock in the fully-staged position is inhibited if one or more of the electrical terminals are not properly retained by one or more of the flexible terminal retaining arms.

In some aspects, the techniques described herein relate to an electrical connector, wherein placement of the independent secondary lock in the fully-staged position is inhibited if the flexible latching arm is not properly engaged with the inner housing.

In some aspects, the techniques described herein relate to an electrical connector, wherein the outer housing defines a first protrusion extending in a first lateral direction and the independent secondary lock defines a second protrusion extending in a second lateral direction, wherein the first protrusion is offset from the second protrusion when the independent secondary lock is in the pre-staged position, thereby allowing relative movement between the inner and outer housings and wherein the first protrusion is aligned with the second protrusion when the independent secondary lock is in the fully-staged position, thereby inhibiting relative movement between the inner and outer housings.

In some aspects, the techniques described herein relate to an electrical connector, wherein the independent secondary lock defines an independent secondary lock interlocking tab extending from independent secondary lock and the outer housing defines a corresponding housing interlocking tab extending from the outer housing, wherein the independent secondary lock interlocking tab is laterally offset from the housing interlocking tab when the independent secondary lock is in the pre-staged position, thereby allowing longitudinal movement of the outer housing relative to the inner housing and wherein the independent secondary lock interlocking tab is laterally aligned with the housing interlocking tab when the independent secondary lock is in the fully-staged position, thereby inhibiting longitudinal movement of the outer housing relative to the inner housing.

In some aspects, the techniques described herein relate to an electrical connector, wherein a first sidewall of the outer housing defines a first aperture through which the independent secondary lock is inserted and moved between the pre-staged position and the fully-staged position.

In some aspects, the techniques described herein relate to an electrical connector, wherein a second sidewall of the nose housing opposite the first sidewall of the outer housing defines a second aperture into which an end of the independent secondary lock is inserted when the independent secondary lock is in the fully-staged position.

In some aspects, the techniques described herein relate to an electrical connector, wherein the independent secondary lock is inserted into the inner housing through a first aperture in a first sidewall of the outer housing.

In some aspects, the techniques described herein relate to an electrical connector, wherein a first portion of the electrical terminals has a different size than a second portion of the electrical terminals and wherein a first portion of the pads associated with the first portion of the electrical terminals has a different size than a second portion of the pads associated with the second portion of the electrical terminals.

In some aspects, the techniques described herein relate to an electrical connector, wherein the nose housing is secured to the inner housing by latch features on the inner housing that are disposed within openings defined by the nose housing.

In some aspects, the techniques described herein relate to a method of assembling an electrical connector, including the steps of: providing an inner housing defining a plurality of terminal cavities and a plurality of flexible terminal retaining arms configured to retain electrical terminals within the terminal cavities; providing a nose housing defining a plurality of apertures; providing an outer housing having a flexible latching arm extending from the outer housing; aligning the plurality of apertures with openings of the terminal cavities and attaching the nose housing to the inner housing; inserting an independent secondary lock defining a plurality of raised pads and a tab within the inner housing and placing it in a pre-staged position; attaching the outer housing to the inner housing by engaging the flexible latching arm with the inner housing, wherein the tab is offset from the flexible latching arm when the independent secondary lock is in the pre-staged position, thereby allowing the flexible latching arm to flex as it engages with the inner housing; inserting the electrical terminals within the terminal cavities, wherein the pads are offset from the terminal retaining arms when the independent secondary lock is in the pre-staged position, thereby allowing the terminal retaining arms to flex as the electrical terminals are inserted within the terminal cavities; and moving the independent secondary lock from the pre-staged position to a fully-staged position, wherein the pads are aligned with the terminal retaining arms, thereby inhibiting the terminal retaining arms from flexing and inhibiting removal of the electrical terminals from the terminal cavities and wherein the tab is aligned with the flexible latching arm, thereby inhibiting the flexible latching arm from flexing and disengaging from the inner housing.

The method of the preceding paragraph can optionally include, additionally and/or alternatively any, one or more of the following features, configurations and/or additional components.

In some aspects, the techniques described herein relate to a method, wherein the step of moving the independent secondary lock from the pre-staged position to the fully-staged position is inhibited if one or more of the electrical terminals is not properly retained by one or more of the flexible terminal retaining arms.

In some aspects, the techniques described herein relate to a method, wherein the step of moving the independent secondary lock from the pre-staged position to the fully-staged position is inhibited if the flexible latching arm is not properly engaged with the inner housing.

In some aspects, the techniques described herein relate to a method, wherein the outer housing defines a first protrusion extending in a first lateral direction and the independent secondary lock defines a second protrusion extending in a second lateral direction, wherein the first protrusion is offset from the second protrusion when the independent secondary lock is in the pre-staged position, thereby allowing relative movement between the inner and outer housings and wherein the first protrusion is aligned with the second protrusion when the independent secondary lock is in the fully-staged position, thereby inhibiting relative movement between the inner and outer housings.

In some aspects, the techniques described herein relate to a method, wherein the independent secondary lock defines an independent secondary lock interlocking tab extending from the independent secondary lock and the outer housing defines a corresponding housing interlocking tab extending from the outer housing, wherein the independent secondary lock interlocking tab is laterally offset from the housing interlocking tab when the independent secondary lock is in the pre-staged position, thereby allowing longitudinal movement of the outer housing relative to the inner housing and wherein the independent secondary lock interlocking tab is laterally aligned with the housing interlocking tab when the independent secondary lock is in the fully-staged position, thereby inhibiting longitudinal movement of the outer housing relative to the inner housing.

In some aspects, the techniques described herein relate to a method, wherein the step of inserting an independent secondary lock includes inserting the independent secondary lock through a first aperture in a first sidewall of the outer housing.

In some aspects, the techniques described herein relate to a method, wherein the step of moving the independent secondary lock from the pre-staged position to the fully-staged position includes inserting an end of the independent secondary lock in a second aperture of a second sidewall of the nose housing arranged opposite the first sidewall of the outer housing, thereby inhibiting longitudinal movement of the outer housing relative to the inner housing and nose housing.

In some aspects, the techniques described herein relate to a method, wherein the step of attaching the nose housing to the inner housing includes inserting latch features on the inner housing within openings defined by the nose housing.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector, comprising:

an inner housing defining a plurality of terminal cavities and a plurality of flexible terminal retaining arms configured to retain electrical terminals within the terminal cavities;

a nose housing attached to the inner housing and defining a plurality of apertures arranged and aligned with openings of the terminal cavities;

an independent secondary lock defining a plurality of raised pads and a tab, the independent secondary lock configured to be disposed within the inner housing; and an outer housing to which the inner housing is attached by a flexible latching arm extending from the outer housing and engaging the inner housing, wherein the raised pads are aligned with the terminal retaining arms when the independent secondary lock is in a fully-staged position within the inner housing, thereby inhibiting the terminal retaining arms from flexing and inhibiting removal of the electrical terminals from the terminal cavities and wherein the tab is aligned with the flexible latching arm when the independent secondary lock is in the fully-staged position, thereby inhibiting the flexible latching arm from flexing and disengaging from the inner housing.

2. The electrical connector according to claim 1, wherein the independent secondary lock is slidably attached to the inner housing and is moveable from a pre-staged position to the fully-staged position, wherein the pads are offset from the terminal retaining arms when the independent secondary lock is in the pre-staged position within the inner housing, thereby allowing the terminal retaining arms to flex as the electrical terminals are inserted within the terminal cavities and wherein the tab is offset from the flexible latching arm when the independent secondary lock is in the pre-staged position, thereby allowing the flexible latching arm to flex as it engages with the inner housing.

3. The electrical connector according to claim 2, wherein placement of the independent secondary lock in the fully-staged position is inhibited if one or more of the electrical terminals are not properly retained by one or more of the flexible terminal retaining arms.

4. The electrical connector according to claim 2, wherein placement of the independent secondary lock in the fully-staged position is inhibited if the flexible latching arm is not properly engaged with the inner housing.

5. The electrical connector according to claim 2, wherein the outer housing defines a first protrusion extending in a first lateral direction and the independent secondary lock defines a second protrusion extending in a second lateral direction, wherein the first protrusion is offset from the second protrusion when the independent secondary lock is in the pre-staged position, thereby allowing relative movement between the inner and outer housings and wherein the first protrusion is aligned with the second protrusion when the independent secondary lock is in the fully-staged position, thereby inhibiting relative movement between the inner and outer housings.

6. The electrical connector according to claim 2, wherein the independent secondary lock defines an independent secondary lock interlocking tab extending from independent secondary lock and the outer housing defines a corresponding housing interlocking tab extending from the outer housing, wherein the independent secondary lock interlocking tab is laterally offset from the housing interlocking tab when the independent secondary lock is in the pre-staged position, thereby allowing longitudinal movement of the outer housing relative to the inner housing and wherein the independent secondary lock interlocking tab is laterally aligned with the housing interlocking tab when the independent secondary lock is in the fully-staged position, thereby inhibiting longitudinal movement of the outer housing relative to the inner housing.

7. The electrical connector according to claim 2, wherein a first sidewall of the outer housing defines a first aperture through which the independent secondary lock is inserted and moved between the pre-staged position and the fully-staged position.

8. The electrical connector according to claim 7, wherein a second sidewall of the nose housing opposite the first sidewall of the outer housing defines a second aperture into which an end of the independent secondary lock is inserted when the independent secondary lock is in the fully-staged position.

9. The electrical connector according to claim 1, wherein the independent secondary lock is inserted into the inner housing through a first aperture in a first sidewall of the outer housing.

10. The electrical connector according to claim 9, wherein a first portion of the electrical terminals has a different size than a second portion of the electrical terminals and wherein a first portion of the pads associated with the first portion of the electrical terminals has a different size than a second portion of the pads associated with the second portion of the electrical terminals.

11. The electrical connector according to claim 9, wherein the nose housing is secured to the inner housing by latch features on the inner housing that are disposed within openings defined by the nose housing.

12. A method of assembling an electrical connector, comprising the steps of:

providing an inner housing defining a plurality of terminal cavities and a plurality of flexible terminal retaining arms configured to retain electrical terminals within the terminal cavities;

providing a nose housing defining a plurality of apertures;

providing an outer housing having a flexible latching arm extending from the outer housing;

aligning the plurality of apertures with openings of the terminal cavities and attaching the nose housing to the inner housing;

inserting an independent secondary lock defining a plurality of raised pads and a tab within the inner housing and placing it in a pre-staged position;

attaching the outer housing to the inner housing by engaging the flexible latching arm with the inner housing, wherein the tab is offset from the flexible latching arm when the independent secondary lock is in the pre-staged position, thereby allowing the flexible latching arm to flex as it engages with the inner housing;

inserting the electrical terminals within the terminal cavities, wherein the pads are offset from the terminal retaining arms when the independent secondary lock is in the pre-staged position, thereby allowing the terminal retaining arms to flex as the electrical terminals are inserted within the terminal cavities; and moving the independent secondary lock from the pre-staged position to a fully-staged position, wherein the pads are aligned with the terminal retaining arms, thereby inhibiting the terminal retaining arms from flexing and inhibiting removal of the electrical terminals from the terminal cavities and wherein the tab is aligned with the flexible latching arm, thereby inhibiting the flexible latching arm from flexing and disengaging from the inner housing.

13. The method according to claim 12, wherein the step of moving the independent secondary lock from the pre-staged position to the fully-staged position is inhibited if one or more of the electrical terminals is not properly retained by one or more of the flexible terminal retaining arms.

14. The method according to claim 12, wherein the step of moving the independent secondary lock from the pre-staged position to the fully-staged position is inhibited if the flexible latching arm is not properly engaged with the inner housing.

15. The method according to claim 12, wherein the outer housing defines a first protrusion extending in a first lateral direction and the independent secondary lock defines a second protrusion extending in a second lateral direction, wherein the first protrusion is offset from the second protrusion when the independent secondary lock is in the pre-staged position, thereby allowing relative movement between the inner and outer housings and wherein the first protrusion is aligned with the second protrusion when the independent secondary lock is in the fully-staged position, thereby inhibiting relative movement between the inner and outer housings.

16. The method according to claim 12, wherein the independent secondary lock defines an independent secondary lock interlocking tab extending from the independent secondary lock and the outer housing defines a corresponding housing interlocking tab extending from the outer housing, wherein the independent secondary lock interlocking tab is laterally offset from the housing interlocking tab when the independent secondary lock is in the pre-staged position, thereby allowing longitudinal movement of the outer housing relative to the inner housing and wherein the independent secondary lock interlocking tab is laterally aligned with the housing interlocking tab when the independent secondary lock is in the fully-staged position, thereby inhibiting longitudinal movement of the outer housing relative to the inner housing.

17. The method according to claim 12, wherein the step of inserting an independent secondary lock includes inserting the independent secondary lock through a first aperture in a first sidewall of the outer housing.

18. The method according to claim 17, wherein the step of moving the independent secondary lock from the pre-staged position to the fully-staged position includes inserting an end of the independent secondary lock in a second aperture of a second sidewall of the nose housing arranged opposite the first sidewall of the outer housing, thereby inhibiting longitudinal movement of the outer housing relative to the inner housing and nose housing.

19. The method according to claim 12, wherein the step of attaching the nose housing to the inner housing includes inserting latch features on the inner housing within openings defined by the nose housing.

* * * * *